US012563457B2

(12) United States Patent
Chen et al.

(10) Patent No.: US 12,563,457 B2
(45) Date of Patent: Feb. 24, 2026

(54) CELL RESELECTION

(71) Applicant: Apple Inc., Cupertino, CA (US)

(72) Inventors: Yuqin Chen, Beijing (CN); Alexander Sirotkin, Tel Aviv (IL); Fangli Xu, Beijing (CN); Haijing Hu, Los Gatos, CA (US); Naveen Kumar R. Palle Venkata, San Diego, CA (US); Pavan Nuggehalli, San Carlos, CA (US); Ralf Rossbach, Munich (DE); Sarma Vangala, Campbell, CA (US); Sethuraman Gurumoorthy, San Ramon, CA (US); Sudeep Manithara Vamanan, Nuremberg (DE); Vijay Venkataraman, San Jose, CA (US); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 65 days.

(21) Appl. No.: 17/917,922

(22) PCT Filed: Oct. 21, 2021

(86) PCT No.: PCT/CN2021/125362
§ 371 (c)(1),
(2) Date: Oct. 7, 2022

(87) PCT Pub. No.: WO2023/065232
PCT Pub. Date: Apr. 27, 2023

(65) Prior Publication Data
US 2024/0251307 A1 Jul. 25, 2024

(51) Int. Cl.
*H04W 36/00* (2009.01)

(52) U.S. Cl.
CPC .............................. *H04W 36/0072* (2013.01)

(58) Field of Classification Search
None
See application file for complete search history.

(56) References Cited

U.S. PATENT DOCUMENTS

| | | | |
|---|---|---|---|
| 2020/0337050 A1 | 10/2020 | Mildh | |
| 2021/0136602 A1* | 5/2021 | Pokkunuri | .............. H04W 8/02 |

(Continued)

FOREIGN PATENT DOCUMENTS

| | | |
|---|---|---|
| CN | 111866991 A | 10/2020 |
| CN | 112042225 A | 12/2020 |

(Continued)

OTHER PUBLICATIONS

Leftover Issues for NW Slicing, ZTE Corporation, 3GPP TSG-RAN WG2 NR Ad hoc 1801, R2-1800449, Jan. 26, 2018, 4 pages.

(Continued)

*Primary Examiner* — Sudesh M. Patidar
*Assistant Examiner* — Justin Michael Whitaker
(74) *Attorney, Agent, or Firm* — Kilpatrick Townsend & Stockton LLP

(57) ABSTRACT

Provided is a method performed by a user equipment (UE), comprising: receiving, from a communication network comprising a radio access network, one or more messages comprising configuration information of at least one network slice and of at least one frequency, wherein the radio access network is associated with a plurality of base stations (BSs) providing a plurality of cells, wherein the configuration information indicates for each of the at least one frequency which one or more slices of the at least one network slice are supported; and selecting, based on the configuration information, a cell from the plurality of cells for camping on.

20 Claims, 13 Drawing Sheets

(56)        References Cited

U.S. PATENT DOCUMENTS

| | | | | | |
|---|---|---|---|---|---|
| 2022/0303884 | A1* | 9/2022 | Chen | ...................... | H04W 76/00 |
| 2023/0247685 | A1* | 8/2023 | Choe | ...................... | H04W 76/10 |
| | | | | | 370/329 |
| 2024/0306209 | A1* | 9/2024 | Liu | ................... | H04W 74/0833 |

FOREIGN PATENT DOCUMENTS

| | | |
|---|---|---|
| CN | 113498130 A | 10/2021 |
| WO | 2017140342 A1 | 8/2017 |

OTHER PUBLICATIONS

International Patent Application No. PCT/CN2021/125362, International Search Report and Written Opinion, Mailed on Apr. 27, 2022, 9 pages.

3rd Generation Partnership Project; Technical Specification Group Radio Access Network; NR; User Equipment (UE) procedures in Idle mode and RRC Inactive state (Release 16), 3GPP TS 38.304 V16.6.0, Sep. 2021, 39 pages.

3rd Generation Partnership Project; Technical Specification Group Services and System Aspects; System architecture for the 5G System (5GS); Stage 2 (Release 17), 3GPP TS 23.501 V17.2.0, Sep. 2021, 542 pages.

International Patent Application No. PCT/CN2021/125362, International Preliminary Report on Patentability, May 2, 2024, 5 pages.

Comparison of Solution Options, Lenovo, Motorola Mobility, 3rd Generation Partnership Project Technical Specification Group-Radio Access Network Working Group 2 #115-e meeting, R2-2108025, Aug. 9-27, 2021, 78 pages.

ETSI MCC: Report of 3rd Generation Partnership Project Technical Specification Group Radio Access Network Working Group2 meeting #115-e, Online, Draft R2-115e Meeting Report_v1, 3rd Generation Partnership Project, Mobile Competence Centre, Sep. 15, 2021.

Slice-based Cell/Frequency Prioritization, National Electrical Code, 3rd Generation Partnership Project Technical Specification Group-Radio Access Network Working Group 2 #114-e meeting, R2-2106013, May 19-27, 2021, 4 pages.

Summary of [AT114-e][250][Slicing] Usage of Slice Priorities for Cell, Lenovo, Motorola Mobility, 3rd Generation Partnership Project Technical Specification Group-Radio Access Network Working Group 2 #114-e meeting, R2-2106501, May 19-27, 2021, 31 pages.

European Patent Application No. 21960981.5, Extended European Search Report, Jul. 4, 2025, 18 pages.

* cited by examiner

200

300A

300B

400

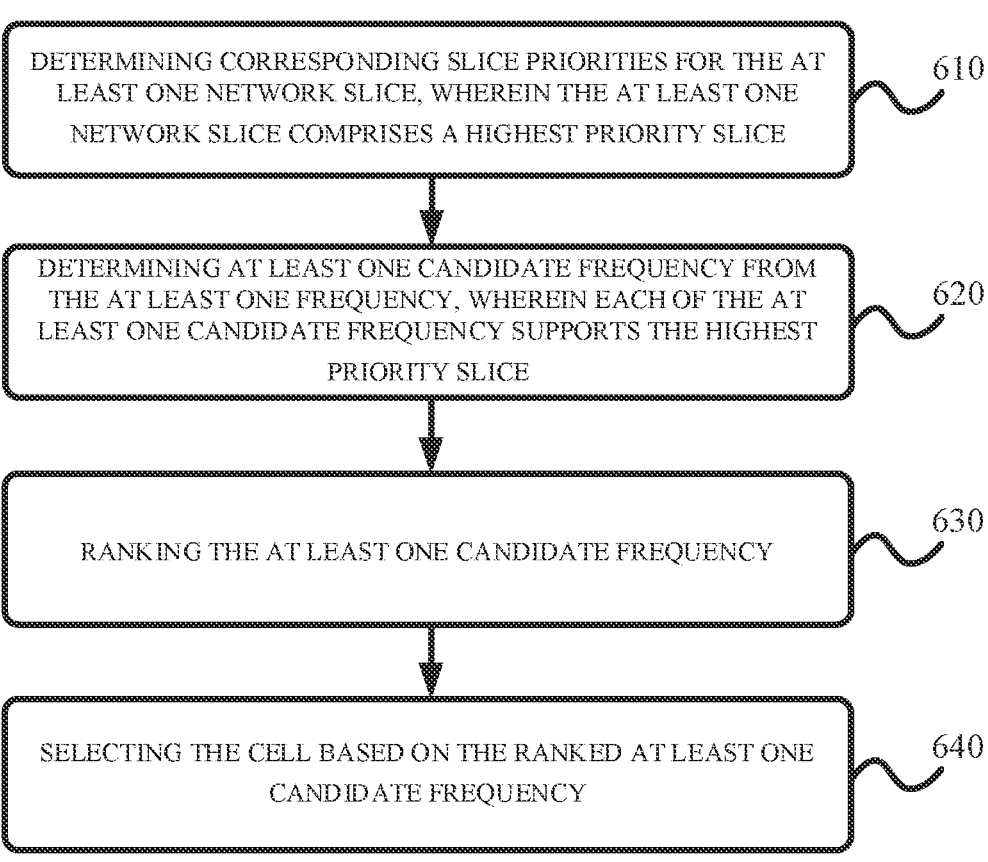

420

DETERMINING CORRESPONDING SLICE PRIORITIES FOR THE AT LEAST ONE NETWORK SLICE, WHEREIN THE AT LEAST ONE NETWORK SLICE COMPRISES A HIGHEST PRIORITY SLICE    610

DETERMINING AT LEAST ONE CANDIDATE FREQUENCY FROM THE AT LEAST ONE FREQUENCY, WHEREIN EACH OF THE AT LEAST ONE CANDIDATE FREQUENCY SUPPORTS THE HIGHEST PRIORITY SLICE    620

RANKING THE AT LEAST ONE CANDIDATE FREQUENCY    630

SELECTING THE CELL BASED ON THE RANKED AT LEAST ONE CANDIDATE FREQUENCY    640

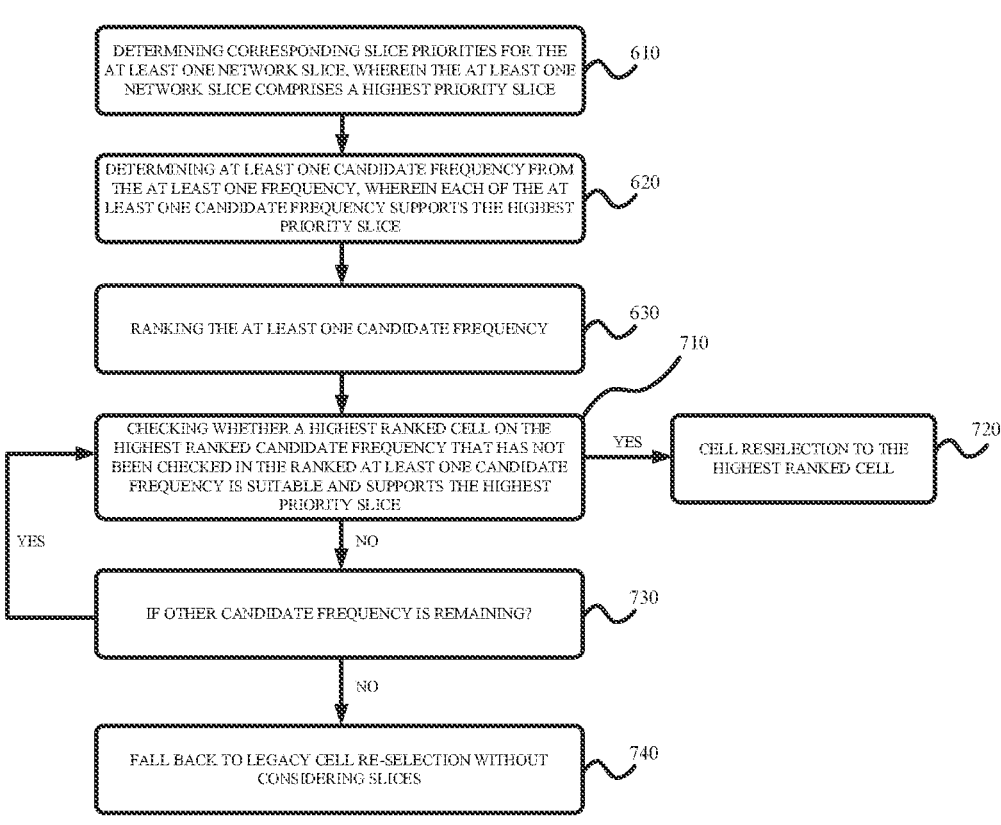

DETERMINING CORRESPONDING SLICE PRIORITIES FOR THE AT LEAST ONE NETWORK SLICE, WHEREIN THE AT LEAST ONE NETWORK SLICE COMPRISES A HIGHEST PRIORITY SLICE — 610

DETERMINING AT LEAST ONE CANDIDATE FREQUENCY FROM THE AT LEAST ONE FREQUENCY, WHEREIN EACH OF THE AT LEAST ONE CANDIDATE FREQUENCY SUPPORTS THE HIGHEST PRIORITY SLICE — 620

RANKING THE AT LEAST ONE CANDIDATE FREQUENCY — 630

710

CHECKING WHETHER A HIGHEST RANKED CELL ON THE HIGHEST RANKED CANDIDATE FREQUENCY THAT HAS NOT BEEN CHECKED IN THE RANKED AT LEAST ONE CANDIDATE FREQUENCY IS SUITABLE AND SUPPORTS THE HIGHEST PRIORITY SLICE

YES → CELL RESELECTION TO THE HIGHEST RANKED CELL — 720

NO

IF OTHER CANDIDATE FREQUENCY IS REMAINING? — 730

YES

NO

FALL BACK TO LEGACY CELL RE-SELECTION WITHOUT CONSIDERING SLICES — 740

CELL RESELECTION

CROSS REFERENCE TO RELATED APPLICATION

This application is a 371 U.S. National Phase of PCT International Patent Application No. PCT/CN2021/125362, filed Oct. 21, 2021, which is herein incorporated by reference in its entirety for all purposes.

TECHNICAL FIELD

This application relates generally to wireless communication systems, and more specifically to cell reselection.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); fifth-generation (5G) 3GPP new radio (NR) standard; the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB), which communicate with a wireless communication device, also known as user equipment (UE).

SUMMARY

According to an aspect of the present disclosure, a method performed by a user equipment (UE) is provided. The method comprises: receiving, from a communication network comprising a radio access network, one or more messages comprising configuration information of at least one network slice and of at least one frequency, wherein the radio access network is associated with a plurality of base stations (BSs) providing a plurality of cells, wherein the configuration information indicates for each of the at least one frequency which one or more slices of the at least one network slice are supported; and selecting, based on the configuration information, a cell from the plurality of cells for camping on.

According to an aspect of the present disclosure, a method performed by a communication network is provided. The method comprises: transmitting, to a user equipment (UE), one or more messages comprising configuration information of at least one network slice and of at least one frequency, wherein the communication network comprises a radio access network, the radio access network is associated with a plurality of base stations (BSs) providing a plurality of cells, wherein the configuration information indicates for each of the at least one frequency which one or more slices of the at least one network slice are supported, and wherein the configuration information is used by UE for selecting a cell from the plurality of cells for camping on.

According to an aspect of the present disclosure, an apparatus for a user equipment (UE) is provided. The apparatus comprises one or more processors configured to perform steps of the method according to any of methods by the UE provided herein.

According to an aspect of the present disclosure, an apparatus for a communication network is provided. The apparatus comprises one or more processors configured to perform steps of the method according to any of methods by the BS provided herein.

According to an aspect of the present disclosure, a computer readable medium is provided, having computer programs stored thereon which, when executed by one or more processors, cause an apparatus to perform steps of the method according to any of methods provided herein.

According to an aspect of the present disclosure, an apparatus for a communication device is provided. The apparatus comprises means for performing steps of the method according to any of methods provided herein.

According to an aspect of the present disclosure, a computer program product is provided, comprising computer programs which, when executed by one or more processors, cause an apparatus to perform steps of the method according to any of methods provided herein.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure.

FIG. 6 illustrates a flowchart for selecting a cell in accordance with some embodiments.

FIG. 7 illustrates an overall flowchart for selecting a cell in accordance with some embodiments.

DETAILED DESCRIPTION

In the present disclosure, a "base station" can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC), and/or a 5G Node, new radio (NR) node or g Node B (gNB), which communicate with a wireless communication device, also known as user equipment (UE). Although some examples may be described with reference to any of E-UTRAN Node B, an eNB, an RNC and/or a gNB, such devices may be replaced with any type of base station.

The principles of PLMN selection in NR are based on the 3GPP PLMN selection principles. Cell selection is required on transition from RM-DEREGISTERED to RM-REGISTERED, from CM-IDLE to CM-CONNECTED and from CM-CONNECTED to CM-IDLE.

The UE may search each carrier in turn ("initial cell selection") or make use of stored information to shorten the search ("stored information cell selection").

The UE seeks to identify a suitable cell. If it is not able to identify a suitable cell it seeks to identify an acceptable cell. When a suitable cell is found or if only an acceptable cell is found it camps on that cell and commences the cell reselection procedure. A suitable cell is one for which the measured cell attributes satisfy the cell selection criteria; the cell PLMN is the selected PLMN, registered or an equivalent PLMN; the cell is not barred or reserved and the cell is not part of a tracking area which is in the list of "forbidden tracking areas for roaming". An acceptable cell is one for which the measured cell attributes satisfy the cell selection criteria and the cell is not barred.

A UE in RRC IDLE/RRC IN ACTIVE performs cell reselection. The UE makes measurements of attributes of the serving and neighbour cells to enable the reselection process. For the search and measurement of inter-frequency neighboring cells, the carrier frequencies may be indicated.

Cell reselection identifies the cell that the UE should camp on. It is based on cell reselection criteria which involves measurements of the serving and neighbour cells. Intra-frequency reselection is based on ranking of cells. Inter-frequency reselection is based on absolute priorities where a UE tries to camp on the highest priority frequency available. A Neighbor Cell List (NCL) can be provided by the serving cell to handle specific cases for intra- and inter-frequency neighboring cells.

Figure 1:
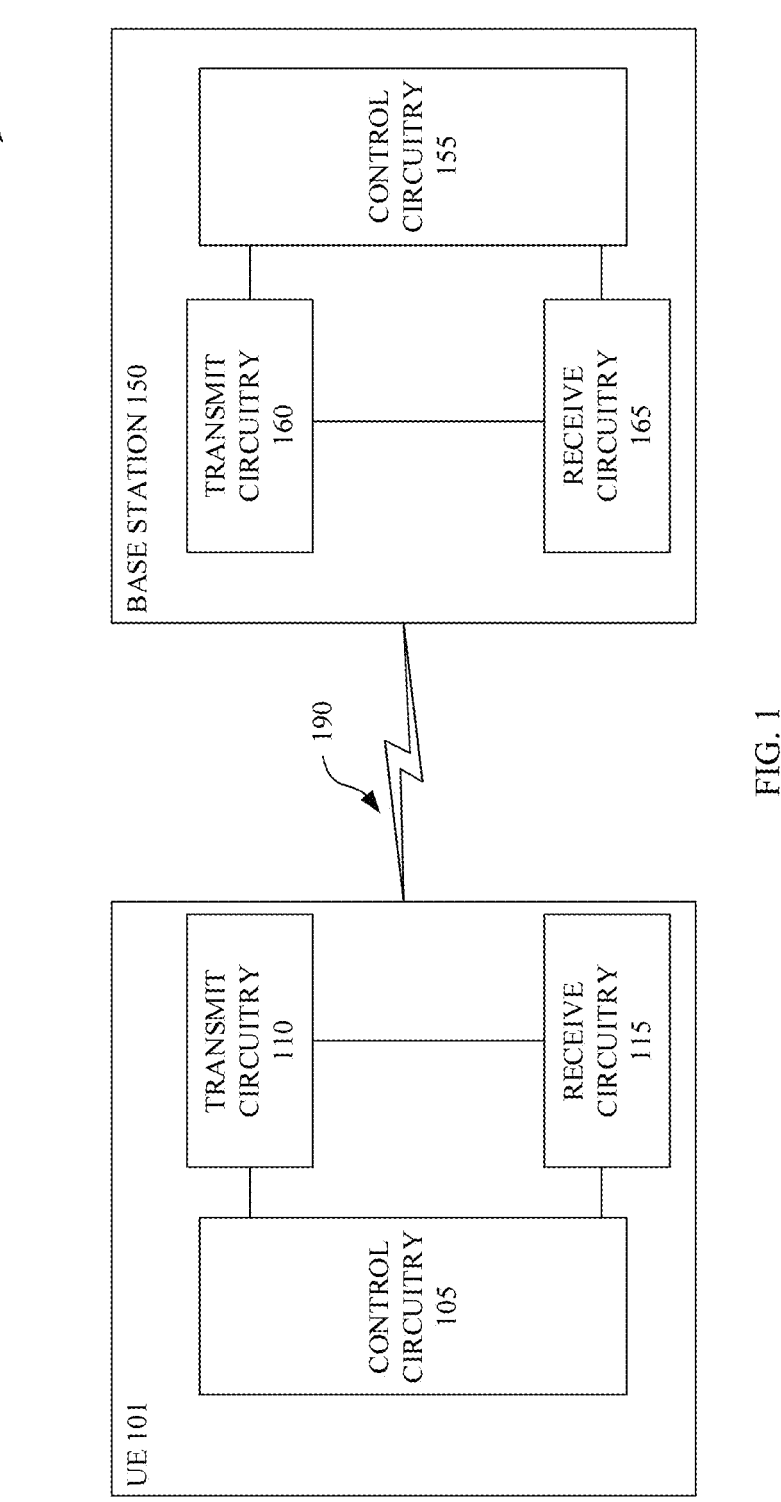
FIG. 1 is a block diagram of a system including a base station (BS) and a user equipment (UE) in accordance with some embodiments.

FIG. 1 illustrates a wireless network 100, in accordance with some embodiments. The wireless network 100 includes a UE 101 and a base station 150 connected via an air interface 190.

The UE 101 and any other UE in the system may be, for example, laptop computers, smartphones, tablet computers, printers, machine-type devices such as smart meters or specialized devices for healthcare monitoring, remote security surveillance, an intelligent transportation system, or any other wireless devices with or without a user interface. The base station 150 provides network connectivity to a broader network (not shown) to the UE 101 via the air interface 190 in a base station service area provided by the base station 150. In some embodiments, such a broader network may be a wide area network operated by a cellular network provider, or may be the Internet. Each base station service area associated with the base station 150 is supported by antennas integrated with the base station 150. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector. One embodiment of the base station 150, for example, includes three sectors each covering a 120 degree area with an array of antennas directed to each sector to provide 360 degree coverage around the base station 150.

The UE 101 includes control circuitry 105 coupled with transmit circuitry 110 and receive circuitry 115. The transmit circuitry 110 and receive circuitry 115 may each be coupled with one or more antennas. The control circuitry 105 may be adapted to perform operations associated with MTC. In some embodiments, the control circuitry 105 of the UE 101 may perform calculations or may initiate measurements associated with the air interface 190 to determine a channel quality of the available connection to the base station 150. These calculations may be performed in conjunction with control circuitry 155 of the base station 150. The transmit circuitry 110 and receive circuitry 115 may be adapted to transmit and receive data, respectively. The control circuitry 105 may be adapted or configured to perform various operations such as those described elsewhere in this disclosure related to a UE. The transmit circuitry 110 may transmit a plurality of multiplexed uplink physical channels. The plurality of uplink physical channels may be multiplexed according to time division multiplexing (TDM) or frequency division multiplexing (FDM). The transmit circuitry 110 may be configured to receive block data from the control circuitry 105 for transmission across the air interface 190. Similarly, the receive circuitry 115 may receive a plurality of multiplexed downlink physical channels from the air interface 190 and relay the physical channels to the control circuitry 105. The uplink and downlink physical channels may be multiplexed according to TDM or FDM. The transmit circuitry 110 and the receive circuitry 115 may transmit and receive both control data and content data (e.g. messages, images, video, et cetera) structured within data blocks that are carried by the physical channels.

FIG. 1 also illustrates the base station 150, in accordance with various embodiments. The base station 150 circuitry may include control circuitry 155 coupled with transmit circuitry 160 and receive circuitry 165. The transmit circuitry 160 and receive circuitry 165 may each be coupled with one or more antennas that may be used to enable communications via the air interface 190.

The control circuitry 155 may be adapted to perform operations associated with MTC. The transmit circuitry 160 and receive circuitry 165 may be adapted to transmit and receive data, respectively, within a narrow system bandwidth that is narrower than a standard bandwidth structured for person to person communication. In some embodiments, for example, a transmission bandwidth may be set at or near 1.4 MHz. In other embodiments, other bandwidths may be used. The control circuitry 155 may perform various operations such as those described elsewhere in this disclosure related to a base station.

Within the narrow system bandwidth, the transmit circuitry 160 may transmit a plurality of multiplexed downlink physical channels. The plurality of downlink physical channels may be multiplexed according to TDM or FDM. The transmit circuitry 160 may transmit the plurality of multiplexed downlink physical channels in a downlink superframe that is comprised of a plurality of downlink subframes.

Within the narrow system bandwidth, the receive circuitry 165 may receive a plurality of multiplexed uplink physical channels. The plurality of uplink physical channels may be multiplexed according to TDM or FDM. The receive circuitry 165 may receive the plurality of multiplexed uplink physical channels in an uplink super-frame that is comprised of a plurality of uplink subframes.

As described further below, the control circuitry 105 and 155 may be involved with measurement of a channel quality for the air interface 190. The channel quality may, for example, be based on physical obstructions between the UE 101 and the base station 150, electromagnetic signal interference from other sources, reflections or indirect paths between the UE 101 and the base station 150, or other such sources of signal noise. Based on the channel quality, a block of data may be scheduled to be retransmitted multiple times, such that the transmit circuitry 110 may transmit copies of the same data multiple times and the receive circuitry 115 may receive multiple copies of the same data multiple times.

With cell selection, the UE searches for a suitable cell of the selected PLMN, chooses that cell to provide available services, and monitors its control channel. This procedure is defined as "camping on the cell". With slice-based cell selection, the UE also considers the available slices in a cell, and slice-related information, when deciding which cell to choose to provide available services.

In the current design on RAN slicing, homogeneous slice deployment is assumed in a tracking area (TA) for a UE. RAN2 current agreement in RAN2 #115 on solution direction is as follows:

Step 0: NAS layer at UE provides slice information to AS layer at UE, including slice priorities.

Step 1: AS sorts slices in priority order starting with highest priority slice.

Step 2: Select slices in priority order starting with the highest priority slice.

Step 3: For the selected slice assign priority to frequencies received from network.

Step 4: Starting with the highest priority frequency, perform measurements (same as legacy).

Step 5: If the highest ranked cell is suitable (as defined in TS 38.304) and supports the selected slice in step 2 then camp on the cell and exit this sequence of operation; FFS: How the UE determines whether the highest ranked cell supports the selected slice.

Step 6: Otherwise, if there are remaining frequencies then go back to step 4.

Step 7: FFS: If the end of the slice list has not been reached go back to step 2.

Step 8: Perform legacy cell re-selection.

Figure 2:
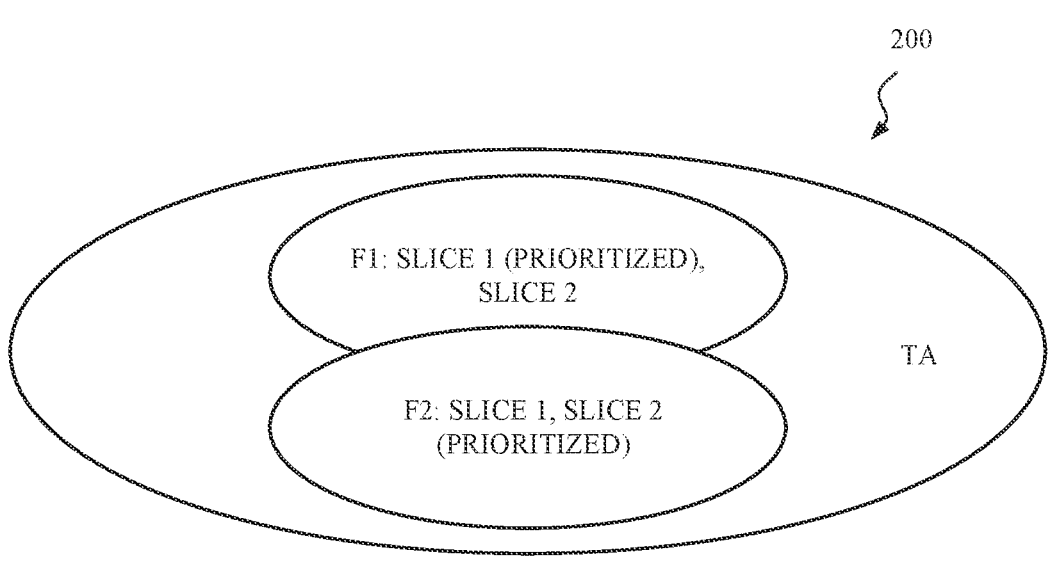
FIG. 2 depicts a scenario where two frequencies are overlapping with supporting the same slices with different priorities and homogeneous deployment inside one TA.

FIG. 2 depicts a scenario 200 where two frequencies are overlapping with supporting the same slices with different priorities, and homogeneous deployment inside one TA. The current agreement has no issues with the scenario 200 for the UE to camp on a cell with slice-based cell reselection.

Figure 3A:
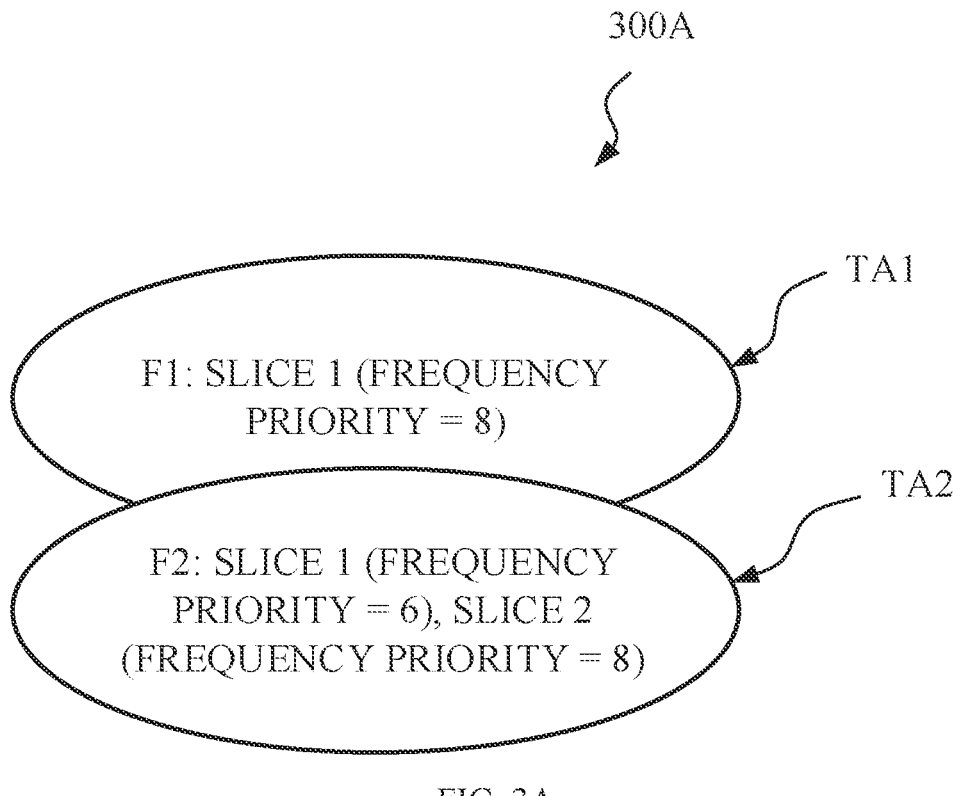
FIGS. 3A and 3B illustrate different application scenarios in accordance with some embodiments.

FIG. 3A illustrates an application scenario 300A in accordance with some embodiments. As shown in FIG. 3A, network (NW) configures multiple frequencies with supporting the prioritized slice (slice 1) of UE. Different frequencies are deployed in different TAs. For example, frequency 1 (F1) is deployed in TA1 and frequency 2 (F2) is deployed in TA2.

With scenario 300A, supposing UE registers in TA2 in the beginning, with allowed Single Network Slice Selection Assistance Information (S-NSSAI) of slices 1 and 2.

UE performs cell re-selection (and also registration update) to TA1 since F1 has a higher priority than F2 for slice 1.

When UE performs registration update on F1 (TA1), slice 2 would be rejected since it is not supported.

Afterwards, if UE initiates traffic for another slice (slice 2), UE has to be re-directed by NW, leading to high signaling overhead over both AS (to perform RRCConnection Setup) and NAS layers (to perform Tracking Area Update (TAU)) and long latency as well.

Consequently. UE gets stuck in a cell only supporting the prioritized slice (slice 1).

Figure 3B:
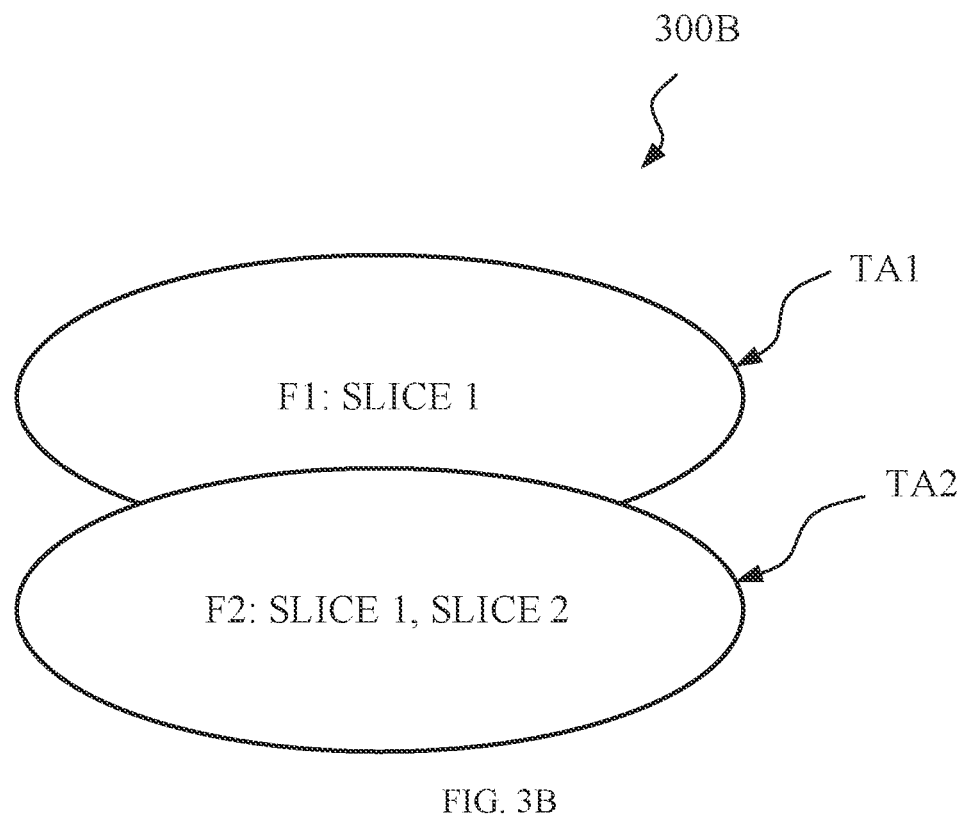

FIG. 3B illustrates another application scenario 300B in accordance with some embodiments. As shown in FIG. 3B, NW configures multiple frequencies with supporting the prioritized slice (slice 1) of UE. Different frequencies are deployed in different TAs. For example, frequency 1 (F1) is deployed in TA1 and frequency 2 (F2) is deployed in TA2.

Unlike scenario 300A, in scenario 300B, NW does not configure the frequency priority. As a result. UE is not able to compare the priority between F1 and F2.

The current design is not applicable to scenario 300A and 300B. A new solution is needed.

Figure 4:
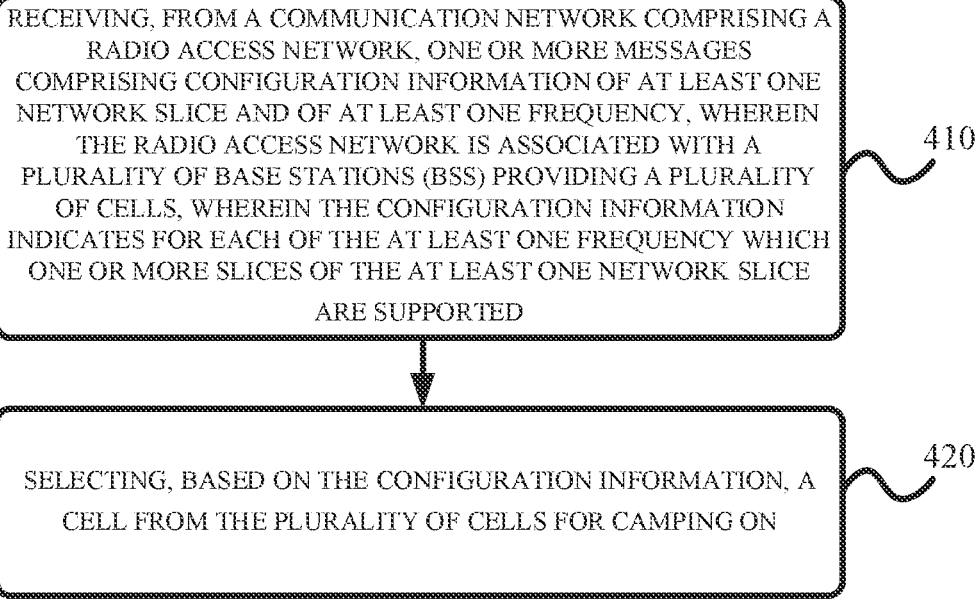
FIG. 4 illustrates a flowchart for a method performed by a UE in accordance with some embodiments.

FIG. 4 illustrates a flowchart for a method 400 performed by a UE in accordance with some embodiments. As shown in FIG. 4, method 400 comprises steps 410 to 420.

In step 410, UE receives from a communication network comprising a radio access network (RAN), one or more messages comprising configuration information of at least one network slice and of at least one frequency. The radio access network is associated with a plurality of base stations (BSs) providing a plurality of cells. The configuration information indicates for each of the at least one frequency which one or more slices of the at least one network slice are supported.

In some embodiments, the configuration information may indicate for each frequency, the number of supported slices by the frequency and S-NSSAI for each of supported slices.

In some embodiments, the configuration information may indicate the slice priority or the frequency priority for each slice.

In step 420, UE selects a cell from the plurality of cells for camping on based on the configuration information.

In some embodiments, the communication network further comprises a core network (CN), and the one or more messages comprise first one or more messages from the radio access network and second one or more messages from the core network.

In some embodiments, the second one or more messages comprise Registration Accept.

In some embodiments, the first one or more messages comprise System Information Block (SIB).

Figure 5:
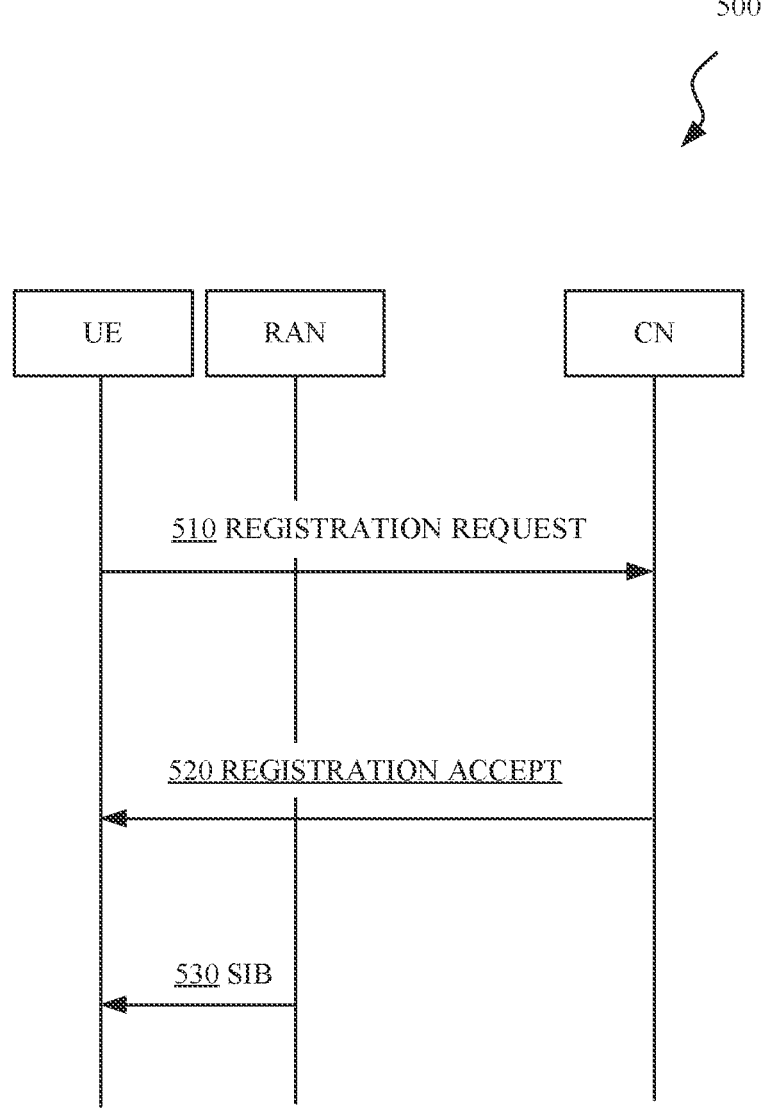
FIG. 5 illustrates a transmit scenario with configuration information between a UE and a communication network in accordance with some embodiments.

FIG. 5 illustrates a transmit scenario 500 with configuration information between a UE and a communication network in accordance with some embodiments. As shown in FIG. 5, a communication system comprises a RAN and a CN. UE sends a message 510, e.g., Registration Request, to core network (CN) for initial attach. CN responds by sending a message 520, e.g., Registration Accept, to UE. RAN may send or broadcast a message 530, e.g., SIB, and UE may receive it. In some implementations, the message 520 and message 530 may comprise configuration information of at least one network slice and of at least one frequency.

FIG. 6 illustrates a flowchart for selecting a cell in accordance with some embodiments. As shown in FIG. 6, selecting the cell step (step 420) comprises steps 610 to 640.

In step 610, determining corresponding slice priorities for the at least one network slice, the at least one network slice comprises a highest priority slice.

In step 620, determining at least one candidate frequency from the at least one frequency, wherein each of the at least one candidate frequency supports the highest priority slice.

In step 630, ranking the at least one candidate frequency.

In step 640, selecting the cell based on the ranked at least one candidate frequency.

In some embodiments, determining the corresponding slice priorities for the at least one network slice (step 610) comprises assigning, by the UE, the corresponding slice priorities to the at least one network slice. In some examples, the priority for each slice is determined by UE itself without referring to the messages from NW.

In some embodiments, the second one or more messages indicate the corresponding slice priorities for the at least one network slice, and determining the corresponding slice priorities for the at least one network slice (step 610) comprises determining the corresponding slice priorities from the second one or more messages. In some examples, NW may configure priorities of slices in messages sent to the UE. For example, CN provides prioritized allowed S-NSSAI in registration response or registration allowed message.

In some embodiments, determining the at least one candidate frequency (step 620) comprises counting a corresponding number of slices supported by each of the at least one frequency; and determining at least one frequency with a largest number of supported slices as the at least one candidate frequency.

In some embodiments, the second one or more messages indicate a group of prioritized slices of the at least one network slice, and determining the at least one candidate frequency (step 620) comprises counting a corresponding number of prioritized slices supported by each of the at least one frequency; and determining at least one frequency with a largest number of supported, prioritized slices as the at least one candidate frequency.

In some implementations, NW configuration provides frequency priority. UE may rank the frequencies in the order of the number of slices (or prioritized slices). If multiple frequencies support the same number of slices (or prioritized slices), UE ranks the multiple frequencies according to the frequency priority associated with the highest priority slice. The ranking can be also done by UE implementation. UE starts with the highest priority frequency, and if the highest ranked cell is not suitable or does not support the highest priority slice, UE tries the second priority frequency.

In some implementations, NW configuration does not provide frequency priority. UE may rank the frequencies in the order of the number of slices (or prioritized slices). If multiple frequencies support the same number of slices (or prioritized slices), how UE ranks them is up to implementation.

In some implementations, ranking the at least one candidate frequency (step 630) comprises ranking, by the UE itself, the at least one candidate frequency regardless of frequency priority. For example, UE may randomly choose a candidate frequency.

In some implementations, for each frequency of the at least one frequency, the first one or more messages indicate corresponding frequency priorities for slices supported by the frequency. Ranking the at least one candidate frequency (step) may comprise for each of the at least one candidate frequency: determining a first corresponding frequency priority for the highest priority slice from the corresponding frequency priorities; and ranking the at least one candidate frequency based on first corresponding frequency priorities from high to low.

FIG. 7 illustrates an overall flowchart 700 for selecting a cell in accordance with some embodiments. In FIG. 7, reference signs which are the same as in the FIG. 6 denote the same elements and description of which will not be repeated here. As depicted in FIG. 7, selecting a cell (step 640) further comprises step 710 to 740.

In step 710, checking whether a highest ranked cell on the highest ranked candidate frequency that has not been checked in the ranked at least one candidate frequency is suitable and supports the highest priority slice. In some examples, UE may perform Radio Resource Management (RRM) measurement on cells in a highest ranked candidate frequency. UE may determine the highest ranked cell based on the measurement.

In step 720, in response to a determination that the highest ranked cell is suitable and supports the highest priority slice, selecting the highest ranked cell as the cell for camping on.

In step 730, in response to a determination that the highest ranked cell is not suitable or does not support the highest priority slice, other candidates in the at least one candidate frequency will be selected to perform step 710 again.

In step 740, if all candidate frequencies have been checked and no suitable cell is found, UE will fall back to legacy reselection without considering slices.

Figure 8:
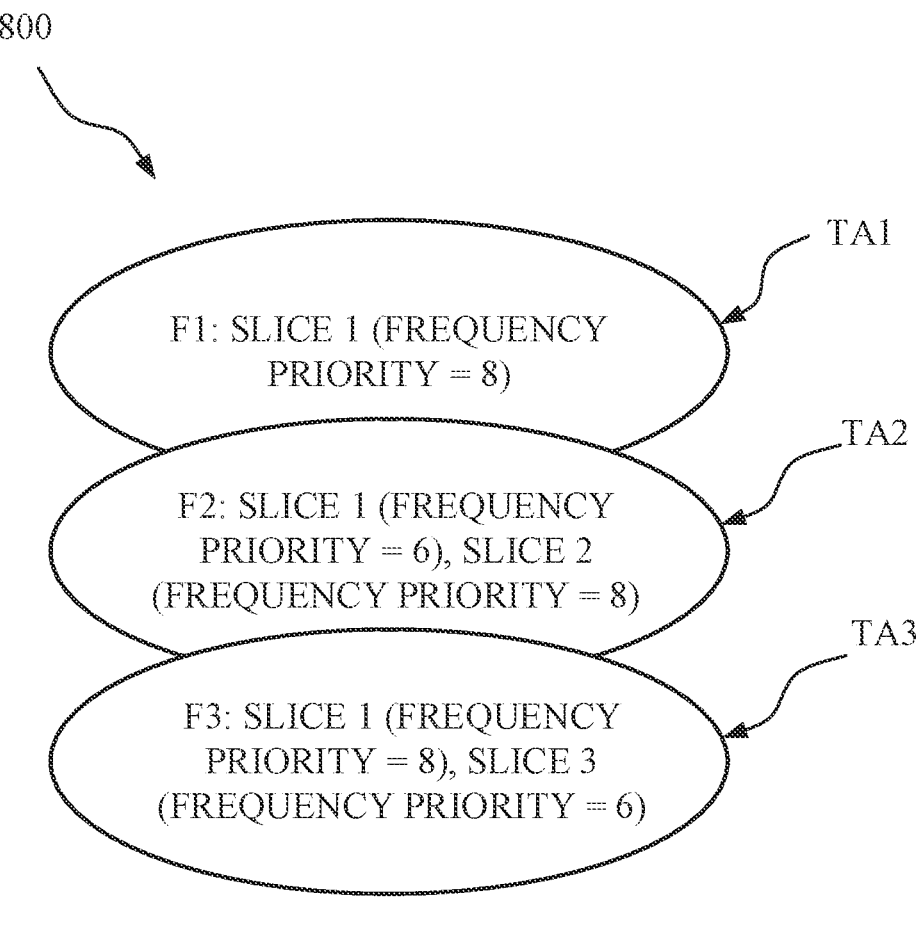
FIG. 8 illustrates an application scenario with frequency priority in accordance with some embodiments.

The application of the method as described in the embodiments will be described combined with FIG. 8. FIG. 8 illustrates an application scenario 800 with frequency priority in accordance with some embodiments. As shown in FIG. 8, frequency 1 (F1), frequency 2 (F2) and frequency 3 (F3) are deployed in TA1, TA2 and TA3, respectively. UE allowed S-NSSAI consists of slice 1, slice 2 and slice 3. Slice 1 is with the highest priority. The frequency priority of F1 for slice 1 is 8. The frequency priority of F2 for slice 1 is 6 and the frequency priority of F2 for slice 2 is 8. The frequency priority of F3 for slice 1 is 8 and the frequency priority of F3 for slice 3 is 6.

In some variants, UE may consider frequencies supporting the largest number of slices as candidate frequencies. In scenario 800, F1 supports one slice (slice 1). F2 supports two slices (slice 1 and slice 2) and F3 supports two slices (slice 1 and slice 3). Therefore, UE determines F2 and F3 as the candidate frequencies. Between these two candidate frequencies, UE may determine the ranking by itself or by the frequency priority for the highest slice (slice 1). In scenario 800, the frequency priority of F2 for slice 1 would be 6 and the frequency priority of F3 for slice 1 is 8. UE will rank F3 as a higher ranked candidate frequency than F2.

UE will check whether the highest ranked cell on F3 is suitable and supports the highest priority slice (slice 1). If the highest ranked cell on F3 is not suitable or does not support the slice 1. UE will continue to check the second priority frequency. i.e., F2. If the highest ranked cell on F2 is not suitable or does not support the slice 1, UE will fallback to legacy cell reselection procedure.

In some variants, UE may consider frequencies supporting the largest number of prioritized slices as candidate frequencies. In some examples, UE allowed S-NSSAI consists of Slice 1, 2 and 3. Slice 1 is with the highest priority and slice 2 is also prioritized.

In scenario 800, F1 supports one prioritized slice (slice 1), F2 supports two prioritized slices (slice 1 and slice 2), and F3 support one prioritized slice (slice 1). Since F2 supports the largest number of prioritized slices, UE determine F2 as the candidate frequency.

UE will check whether the highest ranked cell on F2 is suitable and supports the highest priority slice (slice 1). If the highest ranked cell is not suitable or does not support the slice 1, UE fallbacks to legacy cell reselection procedure.

Figure 9:
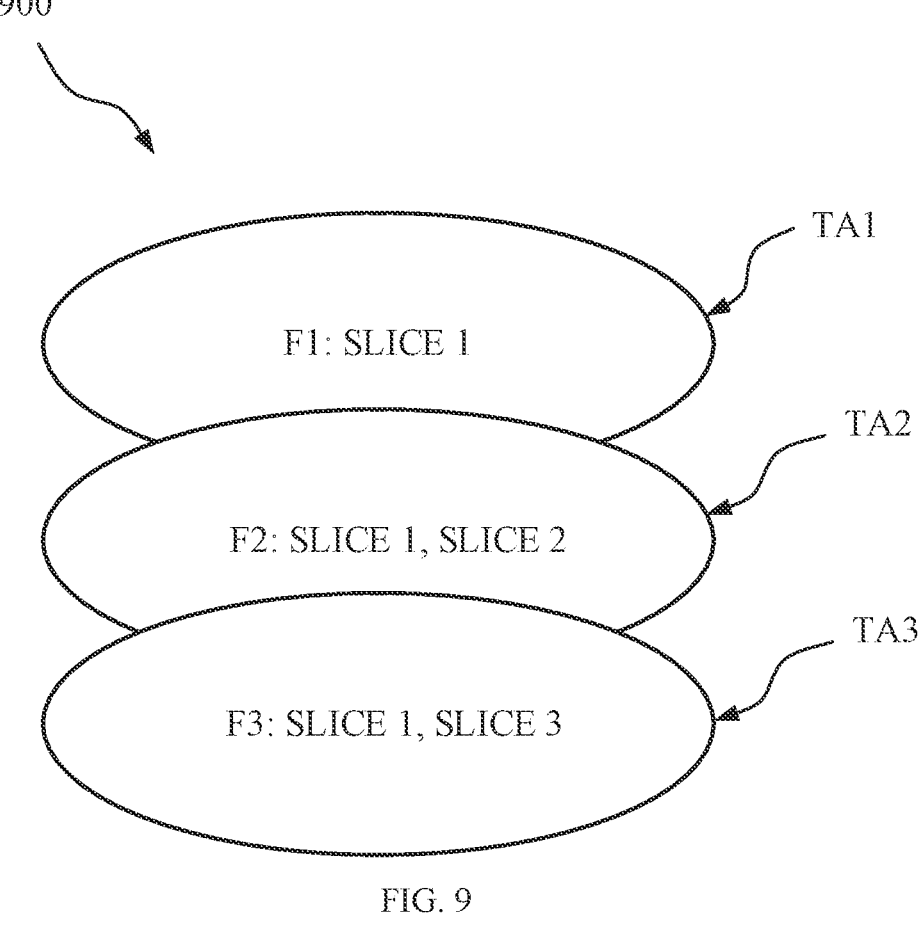
FIG. 9 illustrates an application scenario without frequency priority in accordance with some embodiments.

FIG. 9 illustrates an application scenario 900 without frequency priority in accordance with some embodiments. As shown in FIG. 9, frequency 1 (F1), frequency 2 (F2) and frequency 3 (F3) are deployed in TA1, TA2 and TA3, respectively. UE allowed S-NSSAI consists of slice 1, slice 2 and slice 3. Slice 1 is with the highest priority.

In some variants. UE may consider frequencies supporting the largest number of slices as candidate frequencies. In scenario 900, F1 supports one slice (slice 1), F2 supports two slices (slice 1 and slice 2) and F3 supports two slices (slice 1 and slice 3). Therefore, UE determines F2 and F3 as the candidate frequencies. Between these two candidate frequencies, UE determines the ranking by itself since no frequency priority is provided in scenario 900. In one example, UE may randomly select one candidate frequency.

UE will check whether the highest ranked cell on the highest ranked frequency is suitable and supports the highest priority slice (slice 1). If the highest ranked cell on the highest ranked frequency is not suitable or does not support the slice 1. UE will continue to check the second priority frequency. If the highest ranked cell on other frequencies is not suitable or does not support the slice 1. UE will fallback to legacy cell reselection procedure.

In some variants, UE may consider frequencies supporting the largest number of prioritized slices as candidate frequencies. In some examples, UE allowed S-NSSAI consists of Slice 1, 2 and 3. Slice 1 is with the highest priority and slice 2 is also prioritized.

In scenario 900, F1 supports one prioritized slice (slice 1), F2 supports two prioritized slices (slice 1 and slice 2), and F3 support one prioritized slice (slice 1). Since F2 supports the largest number of prioritized slices, UE determines F2 as the candidate frequency.

UE will check whether the highest ranked cell on F2 is suitable and supports the highest priority slice (slice 1). If the highest ranked cell is not suitable or does not support the slice 1, UE fallbacks to legacy cell reselection procedure.

In some implementations, ranking the at least one candidate frequency comprises: determining corresponding weight factors for the at least one network slice except the highest priority slice, calculating a corresponding sum of weight factors for slices supported by each of the at least one candidate frequency; and ranking the at least one candidate frequency based on corresponding sums from high to low. In some examples, weight factors can be provisioned by CN or can be generated by UE itself based on implementation.

In some embodiments, determining the corresponding weight factors comprises generating the corresponding weight factors by the UE.

In some embodiments, the second one or more messages indicate the corresponding weight factors, and determining the corresponding weight factors comprises determining the corresponding weight factors from the second one or more messages. In some examples, CN may configure weigh factors to each allowed or configured slice. For example, CN may send registration response message indicating allowed or configured S-NNAI with priority and weight factor, except for the highest prioritized slice.

In some embodiments, UE calculates the sum of weighted factors for the supported slices on the frequency, then does ranking on the frequencies based on the summed value.

Reference is now made to FIG. 8 to illustrate the application of weight factors. In scenario 800, UE is configured with allowed S-NSSAI slice 1, 2, 3. Slice 1 is the highest priority slice. Slice 2 is with weight factor 0.8, slice 3 is with weight factor 0.3. All frequencies (F1, F2, F3) supporting the highest priority slice (slice 1) are considered as candidate frequencies. In some examples, for F2, the sum of weight factors for the supported slices is 0.8, In some variants, for F2, the sum of weigh factors for the supported slices is 8×0.8=6.4. The ranking of the candidate frequencies in descending order is: F2, F3, F1

In some embodiments, the at least one frequency comprises a serving frequency on which the UE is currently camping. In some examples, UE follows the same method (e.g., method 400) as described in the embodiments to determine the serving frequency priority.

In some variants, the serving frequency where UE is now camping on is included in the candidate frequencies and considered as the highest prioritized/ranked frequency, if the serving frequency supports the highest prioritized slices. By setting the serving frequency as the highest prioritized/ranked frequency, UE can avoid unnecessary frequency reselection when the current serving frequency supports the highest prioritized slices.

In some variants, the at least one candidate frequency does not comprise a serving frequency on which the UE is currently camping, and ranking the at least one candidate frequency (step 630) comprises ranking each of the at least one candidate frequency as a higher ranked candidate frequency compared with the serving frequency.

In the current design, existing RRM measurement requirement differentiates measurements on frequencies with higher priority than serving frequency and measurements on frequencies with equal/lower priority than serving frequency.

Measurement trigger conditions are different for different frequencies: frequency with higher priority than the serving frequency always requires measurement; frequency with lower priority than the serving frequency only requires measurement when serving cell channel quality is lower than a threshold (Srxlev equal to and smaller than SnonIntraSearchP or Squal equal to and smaller than SnonIntraSearchQ). In the current design, UE simply understands the frequency priority as configured in SIB.

When UE modifies frequency priority (or ranking frequency) according to some embodiments, the potential impact on RRM measurement may result. In some implementations when determining candidate frequencies or ranking, only the frequencies listed as candidate are considered. In some examples, if the candidate frequencies include serving frequency, UE does ranking on both serving frequency and inter-frequencies by considering serving frequency as the highest priority frequency. In some variants, UE does ranking on both serving frequency and inter-frequencies by following the same method as other candidate frequencies, and performs RRM measurement on inter-frequencies according to the requirement. In some examples, if the candidate frequencies do not include serving frequency, UE considers all candidate frequencies are with higher priority (or higher rank). Thus, by considering the ranking or priority of the serving cell, UE may avoid unnecessary RRM measurement.

Figure 10:
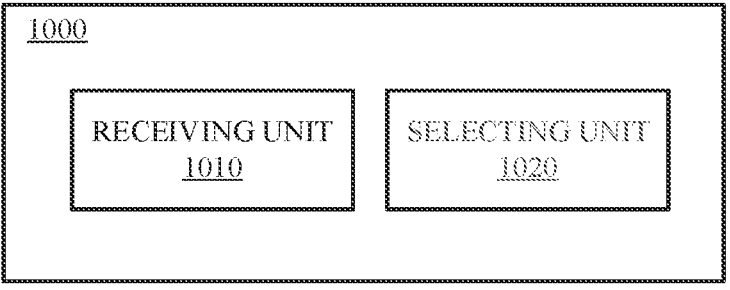
FIG. 10 illustrates a block diagram of an apparatus for a UE in accordance with some embodiments.

FIG. 10 illustrates a block diagram of an apparatus 1000 for a UE in accordance with some embodiments. The apparatus 1000 illustrated in FIG. 10 may comprise one or more processors configured to perform steps of the method 400 as illustrated in combination with FIG. 10. As shown in FIG. 10, the apparatus 1000 includes receiving unit 1010 and selecting unit 1020.

The receiving unit 1010 is configured to receive, from a communication network comprising a radio access network, one or more messages comprising configuration information of at least one network slice and of at least one frequency, wherein the radio access network is associated with a plurality of base stations (BSs) providing a plurality of cells, wherein the configuration information indicates for each of the at least one frequency which one or more slices of the at least one network slice are supported.

The performing unit 1020 is configured to select, based on the configuration information, a cell from the plurality of cells for camping on.

Figure 11:
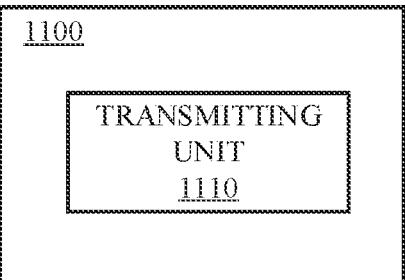
FIG. 11 illustrates a block diagram of an apparatus for a communication network in accordance with some embodiments.

FIG. 11 illustrates a block diagram of an apparatus 1100 for a communication network in accordance with some embodiments. The apparatus 1100 illustrated in FIG. 11 may comprise one or more processors configured to perform steps of the methods as illustrated in some embodiments for a communication network. As shown in FIG. 11, the apparatus 1100 includes transmitting unit 1110.

The transmitting unit 1110 is configured to transmit, to a user equipment (UE), one or more messages comprising configuration information of at least one network slice and of at least one frequency, wherein the communication network comprises a radio access network, the radio access network is associated with a plurality of base stations (BSs) providing a plurality of cells, wherein the configuration information indicates for each of the at least one frequency which one or more slices of the at least one network slice are supported, and wherein the configuration information is used by UE for selecting a cell from the plurality of cells for camping on.

Figure 12:
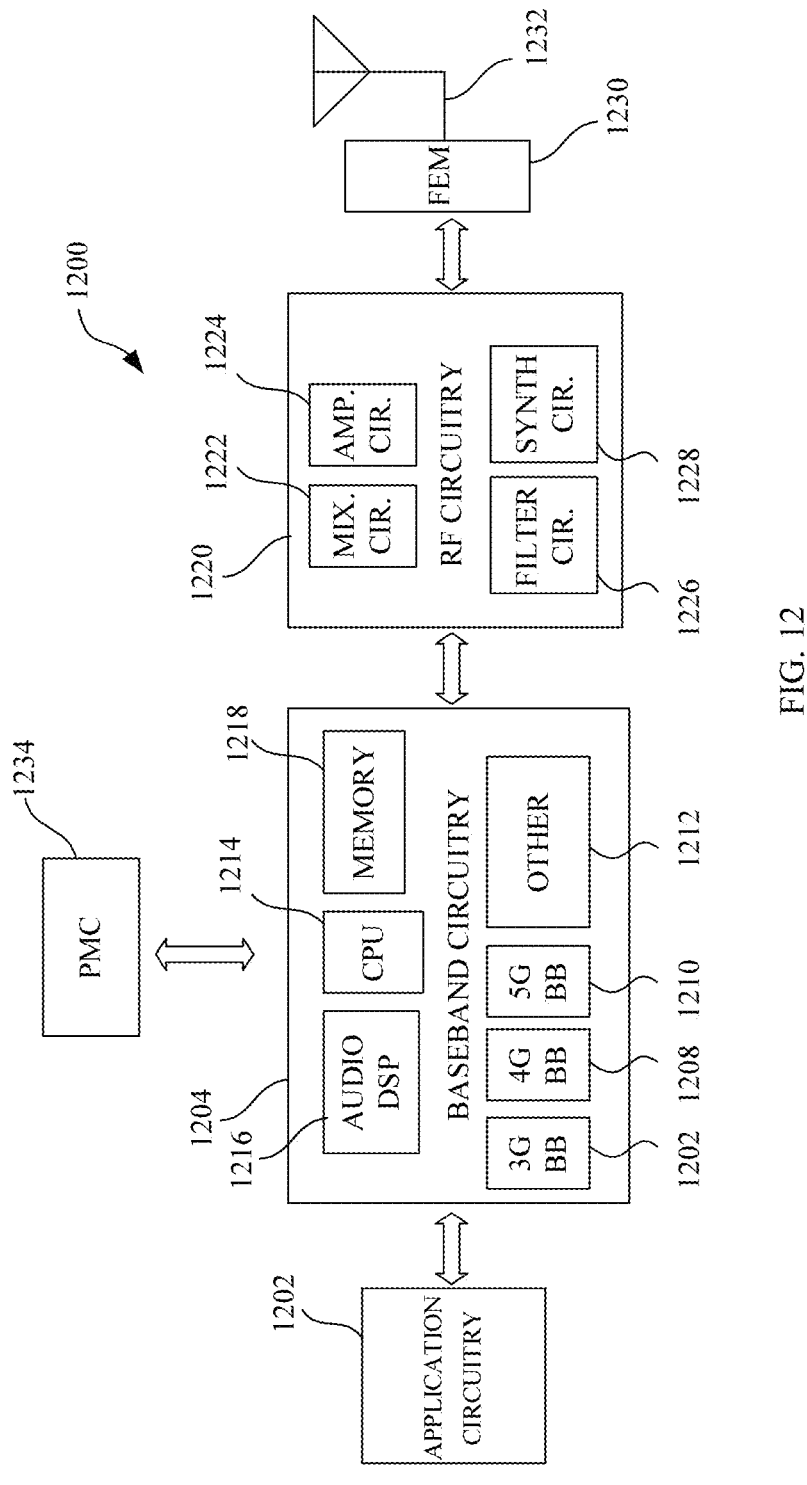
FIG. 12 illustrates example components of a device in accordance with some embodiments.

FIG. 12 illustrates example components of a device 1200 in accordance with some embodiments. In some embodiments, the device 1200 may include application circuitry 1202, baseband circuitry 1204, Radio Frequency (RF) circuitry (shown as RF circuitry 1220), front-end module (FEM) circuitry (shown as FEM circuitry 1230), one or more antennas 1232, and power management circuitry (PMC) (shown as PMC 1234) coupled together at least as shown. The components of the illustrated device 1200 may be included in a UE or a RAN node In some embodiments, the device 1200 may include fewer elements (e.g., a RAN node may not utilize application circuitry 1202, and instead include a processor/controller to process IP data received from an EPC). In some embodiments, the device 1200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1202 may include one or more application processors. For example, the application circuitry 1202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1200. In some embodiments, processors of application circuitry 1202 may process IP data packets received from an EPC.

The baseband circuitry 1204 may include circuitry such as, but not limited to, one or more single-core or multi-core processors. The baseband circuitry 1204 may include one or more baseband processors or control logic to process baseband signals received from a receive signal path of the RF circuitry 1220 and to generate baseband signals for a transmit signal path of the RF circuitry 1220. The baseband circuitry 1204 may interface with the application circuitry 1202 for generation and processing of the baseband signals and for controlling operations of the RF circuitry 1220. For example, in some embodiments, the baseband circuitry 1204 may include a third generation (3G) baseband processor (3G baseband processor 1206), a fourth generation (4G) baseband processor (4G baseband processor 1208), a fifth generation (5G) baseband processor (5G baseband processor 1210), or other baseband processor(s) 1212 for other existing generations, generations in development or to be developed in the future (e.g., second generation (2G), sixth generation (6G), etc.). The baseband circuitry 1204 (e.g., one or more of baseband processors) may handle various radio control functions that enable communication with one or more radio networks via the RF circuitry 1220. In other embodiments, some or all of the functionality of the illustrated baseband processors may be included in modules stored in the memory 1218 and executed via a Central Processing ETnit (CPET 1214). The radio control functions may include, but are not limited to, signal modulation/demodulation, encoding/decoding, radio frequency shifting, etc. In some embodiments, modulation/demodulation circuitry of the baseband circuitry 1204 may include Fast-Fourier Transform (FFT), precoding, or constellation mapping/demapping functionality. In some embodiments, encoding/decoding circuitry of the baseband circuitry 1204 may include convolution, tail-biting convolution, turbo, Viterbi, or Low Density Panty Check (LDPC) encoder/decoder functionality. Embodiments of modulation/demodulation and encoder/decoder functionality are not limited to these examples and may include other suitable functionality in other embodiments.

In some embodiments, the baseband circuitry 1204 may include a digital signal processor (DSP), such as one or more audio DSP(s) 1216. The one or more audio DSP(s) 1216 may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1204 and the application circuitry 1202 may be implemented together such as, for example, on a system on a chip (SOC).

In some embodiments, the baseband circuitry 1204 may provide for communication compatible with one or more radio technologies. For example, in some embodiments, the baseband circuitry 1204 may support communication with an evolved universal terrestrial radio access network (EU-TRAN) or other w ireless metropolitan area networks (WMAN), a wireless local area network (WLAN), or a wireless personal area network (WPAN). Embodiments in which the baseband circuitry 1204 is configured to support radio communications of more than one wireless protocol may be referred to as multi-mode baseband circuitry.

The RF circuitry 1220 may enable communication with wireless networks using modulated electromagnetic radiation through a non-solid medium. In various embodiments, the RF circuitry 1220 may include switches, filters, amplifiers, etc. to facilitate the communication with the wireless network. The RF circuitry 1220 may include a receive signal path which may include circuitry to down-convert RF signals received from the FEM circuitry 1230 and provide baseband signals to the baseband circuitry 1204. The RF circuitry 1220 may also include a transmit signal path which may include circuitry to up-convert baseband signals provided by the baseband circuitry 1204 and provide RF output signals to the FEM circuitry 1230 for transmission. [0141] In some embodiments, the receive signal path of the RF circuitry 1220 may include mixer circuitry 1222, amplifier circuitry 1224 and filter circuitry 1226. In some embodiments, the transmit signal path of the RF circuitry 1220 may include filter circuitry 1226 and mixer circuitry 1222. The RF circuitry 1220 may also include synthesizer circuitry 1228 for synthesizing a frequency for use by the mixer circuitry 1222 of the receive signal path and the transmit signal path In some embodiments, the mixer circuitry 1222 of the receive signal path may be configured to down-convert RF signals received from the FEM circuitry 1230 based on the synthesized frequency provided by synthesizer circuitry 1228. The amplifier circuitry 1224 may be configured to amplify the down-converted signals and the filter circuitry 1226 may be a low-pass filter (LPF) or band-pass filter (BPF) configured to remove unwanted signals from the down-converted signals to generate output baseband signals. Output baseband signals may be provided to the baseband circuitry 1204 for further processing. In some embodiments, the output baseband signals may be zero-frequency baseband signals, although this is not a requirement. In some embodiments, the mixer circuitry 1222 of the receive signal path may comprise passive mixers, although the scope of the embodiments is not limited in this respect.

In some embodiments, the mixer circuitry 1222 of the transmit signal path may be configured to up-convert input baseband signals based on the synthesized frequency provided by the synthesizer circuitry 1228 to generate RF output signals for the FEM circuitry 1230. The baseband signals may be provided by the baseband circuitry 1204 and may be filtered by the filter circuitry 1226.

In some embodiments, the mixer circuitry 1222 of the receive signal path and the mixer circuitry 1222 of the transmit signal path may include two or more mixers and may be arranged for quadrature downconversion and upconversion, respectively. In some embodiments, the mixer circuitry 1222 of the receive signal path and the mixer circuitry 1222 of the transmit signal path may include two or more mixers and may be arranged for image rejection (e.g., Hartley image rejection). In some embodiments, the mixer circuitry 1222 of the receive signal path and the mixer circuitry 1222 may be arranged for direct downconversion and direct upconversion, respectively In some embodiments, the mixer circuitry 1222 of the receive signal path and the mixer circuitry 1222 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1220 may include analog-to-digital converter (ADC) and digital-to-analog converter (DAC) circuitry and the baseband circuitry 1204 may include a digital baseband interface to communicate with the RF circuitry 1220.

In some dual-mode embodiments, a separate radio IC circuitry may be provided for processing signals for each spectrum, although the scope of the embodiments is not limited in this respect.

In some embodiments, the synthesizer circuitry 1228 may be a fractional −N synthesizer or a fractional N/N+1 synthesizer, although the scope of the embodiments is not limited in this respect as other types of frequency synthesizers may be suitable. For example, synthesizer circuitry 1228 may be a delta-sigma synthesizer, a frequency multiplier, or a synthesizer comprising a phase-locked loop with a frequency divider.

The synthesizer circuitry 1228 may be configured to synthesize an output frequency for use by the mixer circuitry 1222 of the RF circuitry 1220 based on a frequency input and a divider control input. In some embodiments, the synthesizer circuitry 1228 may be a fractional N/N+1 synthesizer.

In some embodiments, frequency input may be provided by a voltage controlled oscillator (VCO), although that is not a requirement. Divider control input may be provided by either the baseband circuitry 1204 or the application circuitry 1202 (such as an applications processor) depending on the desired output frequency In some embodiments, a divider control input (e.g., N) may be determined from a look-up table based on a channel indicated by the application circuitry 1202.

Synthesizer circuitry 1228 of the RF circuitry 1220 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 1228 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other In some embodiments, the output frequency may be a LO frequency (fLO). In some embodiments, the RF circuitry 1220 may include an IQ/polar converter.

The FEM circuitry 1230 may include a receive signal path which may include circuitry configured to operate on RF signals received from one or more antennas 1232, amplify the received signals and provide the amplified versions of the received signals to the RF circuitry 1220 for further processing. The FEM circuitry 1230 may also include a transmit signal path which may include circuitry configured to amplify signals for transmission provided by the RF circuitry 1220 for transmission by one or more of the one or more antennas 1232. In various embodiments, the amplification through the transmit or receive signal paths may be done solely in the RF circuitry 1220, solely in the FEM circuitry 1230, or in both the RF circuitry 1220 and the FEM circuitry 1230.

In some embodiments, the FEM circuitry 1230 may include a TX/RX switch to switch between transmit mode and receive mode operation. The FEM circuitry 1230 may include a receive signal path and a transmit signal path. The receive signal path of the FEM circuitry 1230 may include an LNA to amplify received RF signals and provide the amplified received RF signals as an output (e.g., to the RF circuitry 1220). The transmit signal path of the FEM circuitry 1230 may include a power amplifier (PA) to amplify input RF signals (e.g., provided by the RF circuitry 1220), and one or more filters to generate RF signals for subsequent transmission (e.g., by one or more of the one or more antennas 1232).

In some embodiments, the PMC 1234 may manage power provided to the baseband circuitry 1204. In particular, the PMC 1234 may control power-source selection, voltage scaling, battery charging, or DC-to-DC conversion. The PMC 1234 may often be included when the device 1200 is capable of being powered by a battery, for example, when the device 1200 is included in a EGE. The PMC 1234 may increase the power conversion efficiency while providing desirable implementation size and heat dissipation characteristics.

FIG. 12 shows the PMC 1234 coupled only with the baseband circuitry 1204. However, in other embodiments, the PMC 1234 may be additionally or alternatively coupled with, and perform similar power management operations for, other components such as, but not limited to, the application circuitry 1202, the RF circuitry 1220, or the FEM circuitry 1230.

In some embodiments, the PMC 1234 may control, or otherwise be pan of, various power saving mechanisms of the device 1200. For example, if the device 1200 is in an RRC Connected state, where it is still connected to the RAN node as it expects to receive traffic shortly, then it may enter a state known as Discontinuous Reception Mode (DRX) after a period of inactivity. During this state, the device 1200 may power down for brief intervals of time and thus save power.

If there is no data traffic activity for an extended period of time, then the device 1200 may transition off to an RRC Idle state, where it disconnects from the network and does not perform operations such as channel quality feedback, handover, etc. The device 1200 goes into a very low power state and it performs paging where again it periodically wakes up to listen to the network and then powers down again. The device 1200 may not receive data in this state, and in order to receive data, it transitions back to an RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1202 and processors of the baseband circuitry 1204 may be used to execute elements of one or more instances of a protocol stack. For example, processors of the baseband circuitry 1204, alone or in combination, may be used to execute Layer 3, Layer 2, or Layer 1 functionality, while processors of the application circuitry 1202 may utilize data (e.g., packet data) received from these layers and further execute Layer 4 functionality (e.g., transmission communication protocol (TCP) and user datagram protocol (UDP) layers). As referred to herein. Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 13:
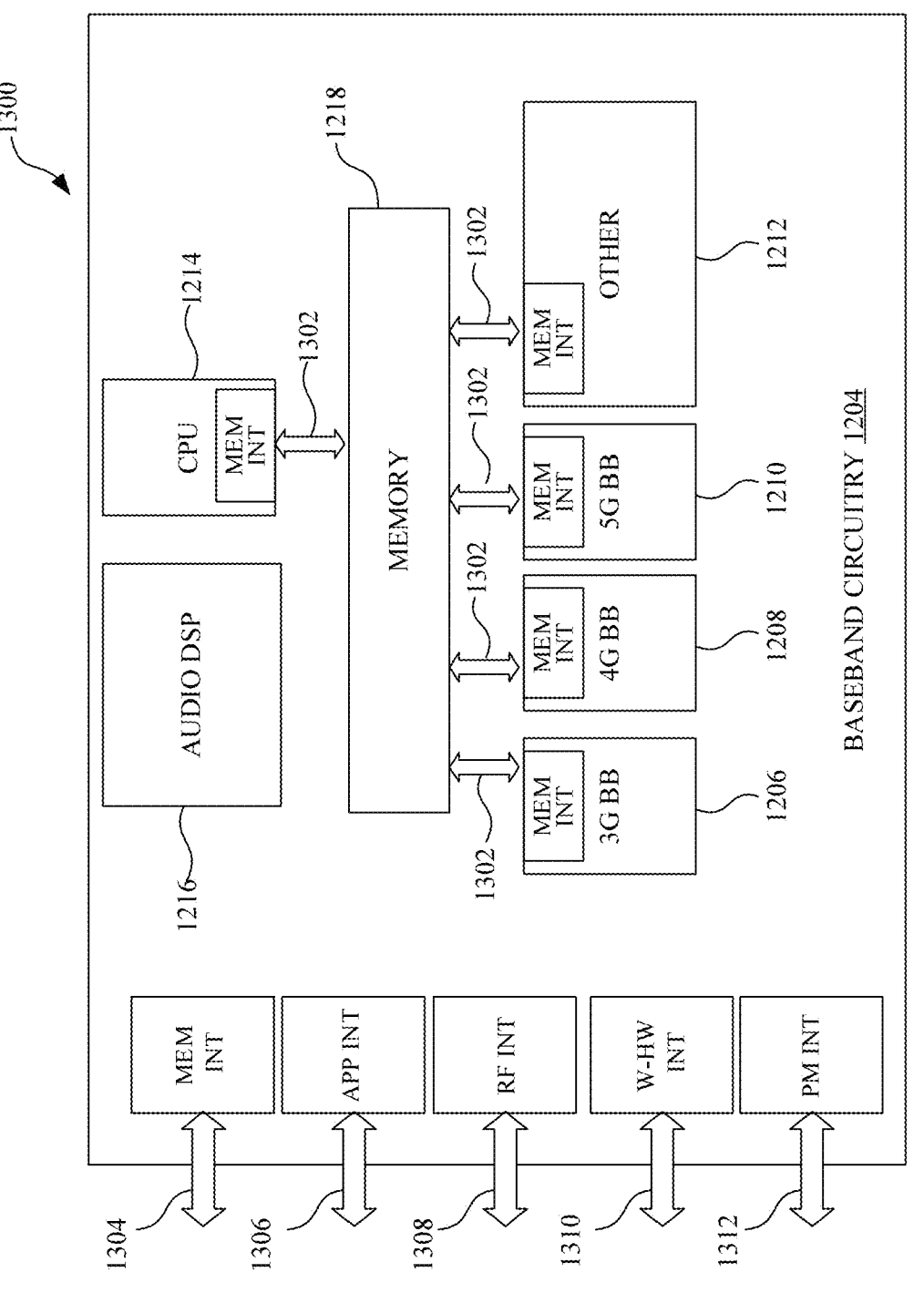
FIG. 13 illustrates example interfaces of baseband circuitry in accordance with some embodiments.

FIG. 13 illustrates example interfaces 1300 of baseband circuitry in accordance with some embodiments. As discussed above, the baseband circuitry 1204 of FIG. 12 may comprise 3G baseband processor 1206, 4G baseband processor 1208, 5G baseband processor 1210, other baseband processor(s) 1212, CPU 1214, and a memory 1318 utilized by said processors. As illustrated, each of the processors may include a respective memory interface 1302 to send/receive data to/from the memory 1318.

The baseband circuitry 1204 may further include one or more interfaces to communicatively couple to other circuitries/devices, such as a memory interface 1304 (e.g., an interface to send/receive data to/from memory external to the baseband circuitry 1304), an application circuitry interface 1306 (e.g., an interface to send/receive data to/from the application circuitry 1202 of FIG. 12), an RF circuitry interface 1308 (e.g., an interface to send/receive data to/from RF circuitry 1220 of FIG. 12), a wireless hardware connectivity interface 1310 (e.g., an interface to send/receive data to/from Near Field Communication (NFC) components, Bluetooth® components (e.g., Bluetooth® Low Energy), Wi-Fi® components, and other communication components), and a power management interface 1312 (e.g., an interface to send/receive power or control signals to/from the PMC 1234.

Figure 14:
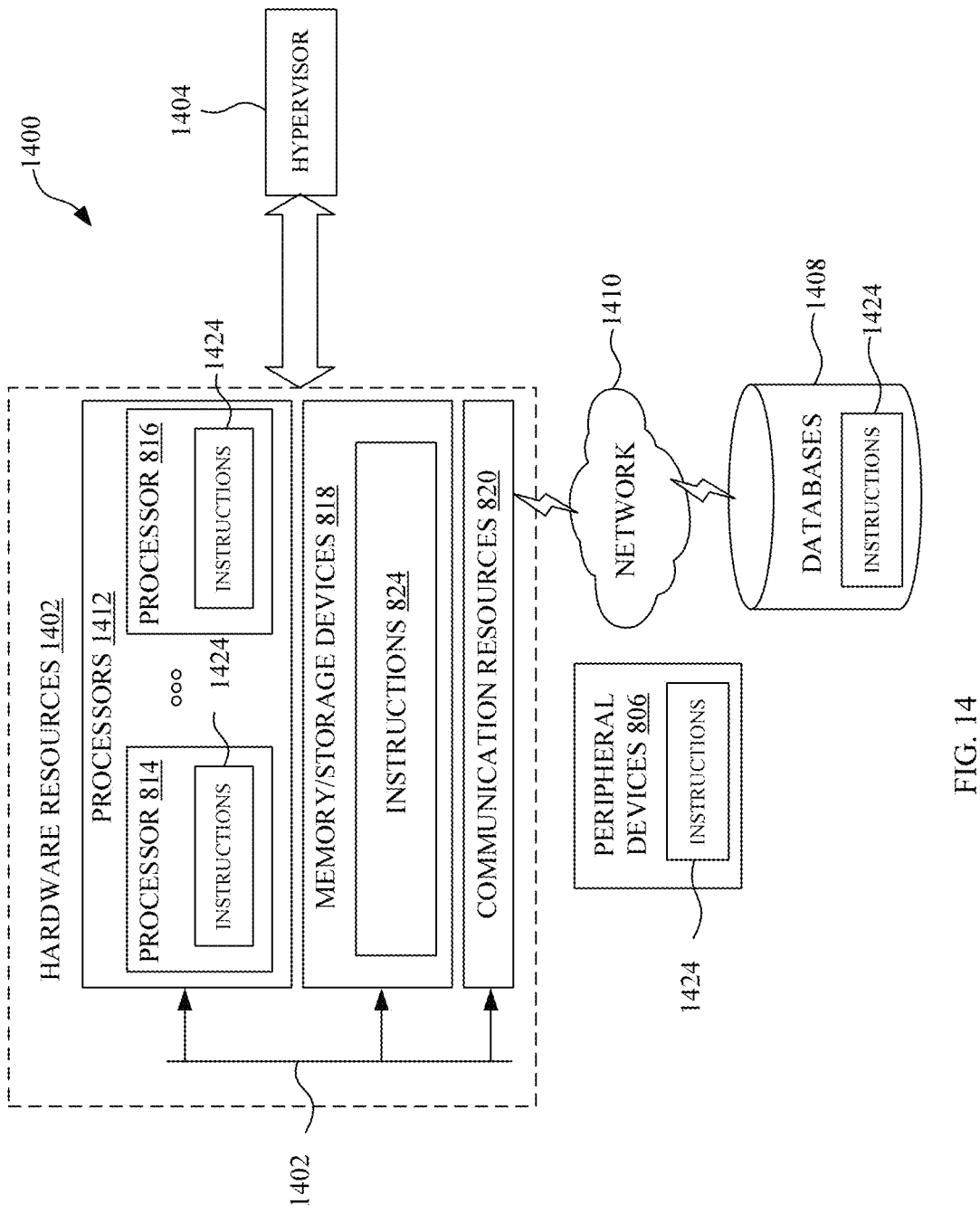
FIG. 14 is a block diagram illustrating components, according to some example embodiments.

FIG. 14 is a block diagram illustrating components 1400, according to some example embodiments, able to read instructions from a machine-readable or computer-readable medium (e.g., a non-transitory machine-readable storage medium) and perform any one or more of the methodologies discussed herein. Specifically, FIG. 14 shows a diagrammatic representation of hardware resources 1402 including one or more processors 1412 (or processor cores), one or more memory/storage devices 1418, and one or more communication resources 1420, each of which may be communicatively coupled via a bus 1422. For embodiments where node virtualization (e.g., NFV) is utilized, a hypervisor 1404 may be executed to provide an execution environment for one or mom network slices/sub-slices to utilize the hardware are resources 1402.

The processors 1412 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1414 and a processor 1416.

The memory/storage devices 1418 may include main memory, disk storage, or any suitable combination thereof. The memory/storage devices 1418 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1420 may include interconnection or network interface components or other suitable dev ices to communicate with one or more peripheral devices 1406 or one or more databases 1408 via a network 1410. For example, the communication resources 1420 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1424 may comprise software, a program, an application, an applet, an app, or other executable code for causing at least any of the processors 1412 to perform any one or more of the methodologies discussed herein. The instructions 1424 may reside, completely or partially, within at least one of the processors 1412 (e.g., within the processor's cache memory), the memory/storage devices 1418, or any suitable combination thereof. Furthermore, any portion of the instructions 1424 may be transferred to the hardware resources 1402 from any combination of the peripheral devices 1406 or the databases 1408. Accordingly, the memory of the processors 1412, the memory/storage devices 1418, the peripheral devices 1406, and the databases 1408 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Figure 15:
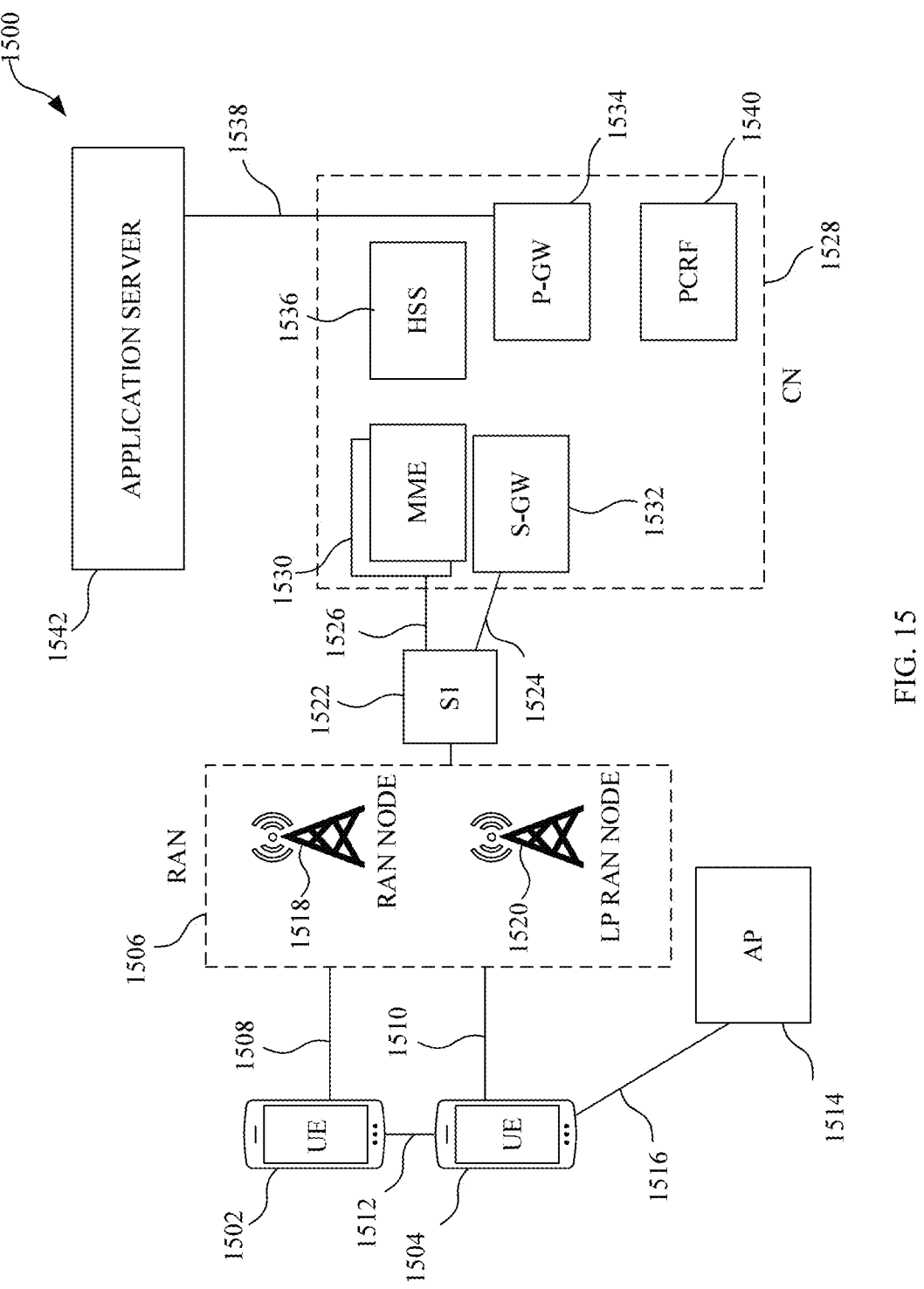
FIG. 15 illustrates an architecture of a system of a network in accordance with some embodiments.

FIG. 15 illustrates an architecture of a system 1500 of a network in accordance with some embodiments. The system 1500 includes one or more user equipment (UE), shown in this example as a UE 1502 and a UE 1504. The UE 1502 and the UE 1504 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UE 1502 and the UE 1104 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. [0102] The UE 1502 and the UE 1504 may be configured to connect, e.g., communicatively couple, with a radio access network (RAN), shown as RAN 1506. The RAN 1506 may be, for example, an Evolved ETniversal Mobile Telecommunications System (ETMTS) Terrestrial Radio Access Network (E-UTRAN), a NextGen RAN (NG RAN), or some other type of RAN. The UE 1502 and the UE 1504 utilize connection 1508 and connection 1510, respectively, each of which comprises a physical communications interface or layer (discussed in further detail below); in this example, the connection 1508 and the connection 1510 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UE 1502 and the UE 1504 may further directly exchange communication data via a ProSe interface 1512. The ProSe interface 1512 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1504 is shown to be configured to access an access point (AP), shown as AP 1154, via connection 1516. The connection 1516 can comprise a local wireless connection, such as a connection consistent with any IEEE 802.15 protocol, wherein the AP 1514 would comprise a wireless fidelity (WiFi®) router. In this example, the AP 1514 may be connected to the Internet without connecting to the core network of the wireless system (described in further detail below).

The RAN 1506 can include one or more access nodes that enable the connection 1508 and the connection 1510. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1506 may include one or more RAN nodes for providing macrocells, e.g., macro RAN node 1518, and one or more RAN nodes for providing femtocells or picocells (e.g., cells having smaller coverage areas, smaller user capacity, or higher bandwidth compared to macrocells), e.g., a low power (LP) RAN node such as LP RAN node 1520. [0106] Any of the macro RAN node 1518 and the LP RAN node 1520 can terminate the air interface protocol and can be the first point of contact for the UE 1502 and the UE 1504. In some embodiments, any of the macro RAN node 1518 and the LP RAN node 1520 can fulfill various logical functions for the RAN 1506 including, but not limited to, radio network controller (RNC) functions such as radio bearer management, uplink and downlink dynamic radio resource management and data packet scheduling, and mobility management.

In accordance with some embodiments, the UE 1502 and the UE 1504 can be configured to communicate using Orthogonal Frequency-Division Multiplexing (OFDM) communication signals with each other or with any of the macro RAN node 1518 and the LP RAN node 1520 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal sub carriers.

In some embodiments, a downlink resource grid can be used for downlink transmissions from any of the macro RAN node 1518 and the LP RAN node 1520 to the UE 1502 and the UE 1504, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 1502 and the UE 1504. The physical downlink control channel (PDCCH) may carry information about the transport format and resource allocations related to the PDSCH channel, among other things. It may also inform the UE 1502 and the UE 1504 about the transport format, resource allocation, and H-ARQ (Hybrid Automatic Repeat Request) information related to the uplink shared channel. Typically, downlink scheduling (assigning control and shared channel resource blocks to the UE 1504 within a cell) may be performed at any of the macro RAN node 1518 and the LP RAN node 1520 based on channel quality information fed back from any of the UE 1502 and UE 1504. The downlink resource assignment information may be sent on the PDCCH used for (e.g., assigned to) each of the UE 1502 and the UE 1504.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 1506 is communicatively coupled to a core network (CN), shown as CN 1528—via an S1 interface 1522. In embodiments, the CN 1528 may be an evolved packet core (EPC) network, a NextGen Packet Core (NPC) network, or some other type of CN. In this embodiment the S1 interface 1522 is split into two parts: the S1-U interface 1524, which carries traffic data between the macro RAN node 1518 and the LP RAN node 1520 and a serving gateway (S-GW), shown as S-GW 1 132, and an S1-mobility management entity (MME) interface, shown as S1-MME interface 1526, which is a signaling interface between the macro RAN node 1518 and LP RAN node 1520 and the MME(s) 1530. [0153] In this embodiment, the CN 1528 comprises the MME(s) 1530, the S-GW 1532, a Packet Data Network (PDN) Gateway (P-GW) (shown as P-GW 1534), and a home subscriber server (HSS) (shown as HSS 1536). The MME(s) 1530 may be similar in function to the control plane of legacy Serving General Packet Radio Service (GPRS) Support Nodes (SGSN). The MME(s) 1530 may manage mobility aspects in access such as gateway selection and tracking area list management. The HSS 1536 may comprise a database for network users, including subscription-related information to support the network entities' handling of communication sessions. The CN 1528 may comprise one or several HSS 1536, depending on the number of mobile subscribers, on the capacity of the equipment, on the organization of the network, etc. For example, the HSS 1536 can provide support for routing/roaming, authentication, authorization, naming/addressing resolution, location dependencies, etc.

The S-GW 1532 may terminate the S1 interface 322 towards the RAN 1506, and mutes data packets between the RAN 1506 and the CN 1528. In addition, the S-GW 1532 may be a local mobility anchor point for inter-RAN node handovers and also may provide an anchor for inter-3 GPP mobility. Other responsibilities may include lawful intercept, charging, and some policy enforcement.

The P-GW 1534 may terminate an SGi interface toward a PDN. The P-GW 1534 may route data packets between the CN 1528 (e.g., an EPC network) and external networks such as a network including the application server 1542 (alternatively referred to as application function (AF)) via an Internet Protocol (IP) interface (shown as IP communications interface 1538). Generally, an application server 1542 may be an element offering applications that use IP bearer resources with the core network (e.g., ETMTS Packet Services (PS) domain, LTE PS data services, etc.). In this embodiment, the P-GW 1534 is shown to be communicatively coupled to an application server 1542 via an IP communications interface 1538. The application server 1542 can also be configured to support one or more communication services (e.g., Voice-over-Internet Protocol (VoIP) sessions, PTT sessions, group communication sessions, social networking services, etc.) for the UE 1502 and the UE 1504 via the CN 1528.

The P-GW 1534 may further be a node for policy enforcement and charging data collection. A Policy and Charging Enforcement Function (PCRF) (shown as PCRF 1540) is the policy and charging control element of the CN 1528. In a non-roaming scenario, there may be a single PCRF in the Home Public Land Mobile Network (HPLMN) associated with a ETE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1540 may be communicatively coupled to the application server 1542 via the P-GW 1534. The application server 1542 may signal the PCRF 1540 to indicate a new service flow and select the appropriate Quality of Service (QoS) and charging parameters. The PCRF 1540 may provision this rule into a Policy and Charging Enforcement Function (PCEF) (not shown) with the appropriate traffic flow template (TFT) and QoS class of identifier (QCI), which commences the QoS and charging as specified by the application server 1542.

Additional Examples

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The following examples pertain to further embodiments.

Example 1 is a method performed by a user equipment (UE), comprising:

receiving, from a communication network comprising a radio access network, one or more messages comprising configuration information of at least one network slice and of at least one frequency, wherein the radio access network is associated with a plurality of base stations (BSs) providing a plurality of cells, wherein the configuration information indicates for each of the at least one frequency which one or more slices of the at least one network slice are supported; and selecting, based on the configuration information, a cell from the plurality of cells for camping on.

Example 2 is the method of example 1, wherein the communication network further comprises a core network, and wherein the one or more messages comprises first one or more messages from the radio access network and second one or more messages from the core network.

Example 3 is the method of example 2, wherein selecting the cell comprises:

determining corresponding slice priorities for the at least one network slice, wherein the at least one network slice comprises a highest priority slice;

determining at least one candidate frequency from the at least one frequency, wherein each of the at least one candidate frequency supports the highest priority slice;

ranking the at least one candidate frequency; and selecting the cell based on the ranked at least one candidate frequency.

Example 4 is the method of example 3, wherein determining the corresponding slice priorities for the at least one network slice comprises assigning, by the UE, the corresponding slice priorities to the at least one network slice.

Example 5 is the method of example 3, wherein the second one or more messages indicate the corresponding slice priorities for the at least one network slice, and wherein determining the corresponding slice priorities for the at least one network slice comprises determining the corresponding slice priorities from the second one or more messages.

Example 6 is the method of example 3, wherein determining the at least one candidate frequency comprises:

counting a corresponding number of slices supported by each of the at least one frequency; and determining at least one frequency with a largest number of supported slices as the at least one candidate frequency.

Example 7 is the method of example 3, wherein the second one or more messages indicate a group of prioritized slices of the at least one network slice, and wherein determining the at least one candidate frequency comprises:

counting a corresponding number of prioritized slices supported by each of the at least one frequency; and determining at least one frequency with a largest number of supported, prioritized slices as the at least one candidate frequency.

Example 8 is the method of example 6 or 7, wherein ranking the at least one candidate frequency comprises ranking, by the UE itself, the at least one candidate frequency regardless of frequency priority.

Example 9 is the method of example 6 or 7, wherein for each frequency of the at least one frequency, the first one or more messages indicate corresponding frequency priorities for slices supported by the frequency, and wherein ranking the at least one candidate frequency comprises:

for each of the at least one candidate frequency:

determining a first corresponding frequency priority for the highest priority slice from the corresponding frequency priorities; and ranking the at least one candidate frequency based on first corresponding frequency priorities from high to low.

Example 10 is the method of example 3, wherein ranking the at least one candidate frequency comprises:

determining corresponding weight factors for the at least one network slice except the highest priority slice;

calculating a corresponding sum of weight factors for slices supported by each of the at least one candidate frequency; and ranking the at least one candidate frequency based on corresponding sums from high to low.

Example 11 is the method of example 10, wherein determining the corresponding weight factors comprises generating the corresponding weight factors by the UE.

Example 12 is the method of example 10, wherein the second one or more messages indicate the corresponding weight factors, and wherein determining the corresponding weight factors comprises determining the corresponding weight factors from the second one or more messages.

Example 13 is the method of any one of the preceding examples, wherein the at least one frequency comprises a serving frequency on which the UE is currently camping.

Example 14 is the method of example 3, wherein the at least one candidate frequency comprises a serving frequency on which the UE is currently camping, and wherein the serving frequency supports the highest priority slice.

Example 15 is the method of example 14, wherein ranking the at least one candidate frequency comprises ranking the serving frequency as a highest ranked frequency.

Example 16 is the method of example 3, wherein the at least one candidate frequency does not comprise a serving frequency on which the UE is currently camping, and wherein ranking the at least one candidate frequency comprises ranking each of the at least one candidate frequency as a higher ranked candidate frequency compared with the serving frequency.

Example 17 is the method of example 3, wherein selecting the cell comprises:

performing following operations until the cell is selected or all of the ranked at least one candidate frequency are checked:

performing Radio Resource Management (RRM) measurement on cells in a highest ranked candidate frequency;

checking whether a highest ranked cell on the highest ranked candidate frequency that has not been chocked in the ranked at least one candidate frequency is suitable and supports the highest priority slice;

in response to a determination that the highest ranked cell is suitable and supports the highest priority slice, selecting the highest ranked cell as the cell for camping on; and in response to a determination that the highest ranked cell is not suitable or does not support the highest priority slice, returning to the performing RRM measurement.

Example 18 is the method of example 17, wherein selecting the cell further comprises:

in response to a determination that all of the ranked at least one candidate frequency are checked and the cell is not selected, performing cell reselection without considering the at least one network slice.

Example 19 is the method of example 2, wherein the first one or more messages comprise System Information Block (SIB).

Example 20 is the method of example 2, wherein the second one or more messages comprise Registration Accept.

Example 21 is a method performed by a communication network, comprising:

transmitting, to a user equipment (UE), one or more messages comprising configuration information of at least one network slice and of at least one frequency, wherein the communication network comprises a radio access network, the radio access network is associated with a plurality of base stations (BSs) providing a plurality of cells, wherein the configuration information indicates for each of the at least one frequency which one or more slices of the at least one network slice are supported, and wherein the configuration information is used by UE for selecting a cell from the plurality of cells for camping on.

Example 22 is the method of example 21, wherein the communication network further comprises a core network, and wherein the one or more messages comprise first one or more messages transmitted by the radio access network and second one or more messages transmitted by the core network.

Example 23 The method of example 22, wherein the second one or more messages indicate corresponding slice priorities for the at least one network slice.

Example 24 is the method of example 22, wherein the second one or more messages indicate a group of prioritized slices of the at least one network slice.

Example 25 is the method of example 22, wherein for each frequency of the at least one frequency, the first one or more messages indicate corresponding frequency priorities for slices supported by the frequency.

Example 26 is the method of example 23, wherein the second one or more messages indicate corresponding weight factors for the at least one network slice except a highest priority slice.

Example 27 is the method of any one of the preceding examples, wherein the at least one frequency comprises a serving frequency, wherein the UE is currently camping on the serving frequency.

Example 28 is the method of example 22, wherein the first one or more messages comprise System Information Block (SIB).

Example 29 is the method of example 22, wherein the second one or more messages comprise Registration Accept.

Example 30 is an apparatus for a user equipment (UE), the apparatus comprising:

one or more processors configured to perform steps of the method according to any of examples 1-20.

Example 31 is an apparatus for a base station (BS), the apparatus comprising:

one or more processors configured to perform steps of the method according to any of examples 21-29.

Example 32 is a computer readable medium having computer programs stored thereon which, when executed by one or more processors, cause an apparatus to perform steps of the method according to any of examples 1-29.

Example 33 is an apparatus for a communication device, comprising means for performing steps of the method according to any of examples 1-29.

Example 34 is a computer program product comprising computer programs which, when executed by one or more processors, cause an apparatus to perform steps of the method according to any of examples 1-29.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. One or more non-transitory, computer-readable media having instructions that, when executed, cause processing circuitry to:

receive, from a communication network that includes a radio access network, one or more messages that include configuration information of at least two network slices and of a plurality of frequencies, wherein the radio access network is associated with a plurality of base stations (BSs) that are to provide a plurality of cells, wherein the configuration information is to indicate for each of the plurality of frequencies which one or more slices of the at least two network slices are supported;

determine corresponding slice priorities for the at least two network slices, wherein the at least two network slices includes a highest-priority slice;

count a corresponding number of slices supported by each of the plurality of frequencies;

determine at least two candidate frequencies from the plurality of frequencies, wherein each of the at least two candidate frequencies supports the highest-priority slice and has a largest number of supported slices;

rank the at least two candidate frequencies; and select a cell from the plurality of cells on which to camp based on the ranked at least two candidate frequencies.

2. The one or more non-transitory, computer-readable media of claim 1, wherein the communication network further includes a core network, and wherein the one or more messages comprises one or more first messages from the radio access network and one or more second messages from the core network.

3. The one or more non-transitory, computer-readable media of claim 2, wherein to determine the corresponding slice priorities for the at least two network slices the processing circuitry is to assign the corresponding slice priorities to the at least two network slices.

4. The one or more non-transitory, computer-readable media of claim 2, wherein the one or more second messages indicate the corresponding slice priorities for the at least two network slices, and wherein to determine the corresponding slice priorities for the at least two network slices the processing circuitry is to determine the corresponding slice priorities from the one or more second messages.

5. The one or more non-transitory, computer-readable media of claim 1, wherein to rank the at least two candidate frequencies the processing circuitry is to rank the at least two candidate frequencies regardless of frequency priority.

6. The one or more non-transitory, computer-readable media of claim 1, wherein for each frequency of the plurality of frequencies, the one or more messages are to indicate corresponding frequency priorities for slices supported by the frequency, and wherein to rank the at least two candidate frequencies the processing circuitry is to, for each of the at least two candidate frequencies:

determine a first corresponding frequency priority for the highest priority slice from the corresponding frequency priorities; and rank the at least two candidate frequencies based on first corresponding frequency priorities from high to low.

7. The one or more non-transitory, computer-readable media of claim 2, wherein the one or more second messages indicate a group of prioritized slices of the at least two network slices, and to determine the at least two candidate frequencies the processing circuitry is to:

count a corresponding number of prioritized slices supported by each of the at least one frequency; and determine two or more frequencies with a largest number of supported, prioritized slices as the at least two candidate frequencies.

8. The one or more non-transitory, computer-readable media of claim 2, wherein to rank the at least two candidate frequencies the processing circuitry is to:

determine corresponding weight factors for the at least two network slices except the highest priority slice;

calculate a corresponding sum of weight factors for slices supported by each of the at least two candidate frequencies; and rank the at least two candidate frequencies based on corresponding sums from high to low.

9. The one or more non-transitory, computer-readable media of claim 8, wherein the one or more second messages are to indicate the corresponding weight factors, and wherein to determine the corresponding weight factors the processing circuitry is to determine the corresponding weight factors from the one or more second messages.

10. A method comprising:

receiving, from a radio access network, one or more first messages that include configuration information of at least two network slices and of a plurality of frequencies, wherein the configuration information indicates for each of the plurality of frequencies which one or more slices of the at least one network slice are supported;

receiving, from a core network, one or more second messages to indicate a weight factor for at least one network slice of the at least two network slices; and selecting a cell from a plurality of cells on which to camp based on the configuration information and the weight factor.

11. The method of claim 10, wherein the one or more second messages further indicate corresponding slice priorities for the at least one network slice.

12. The method of claim 10, wherein the one or more second messages indicate a group of prioritized slices of the at least one network slice.

13. The method of claim 10, wherein for each frequency of the plurality of frequencies, the one or more first messages indicate corresponding frequency priorities for slices supported by the frequency.

14. The method of claim 10, wherein the at least one network slice does not include a highest priority slice.

15. The method of claim 10, wherein the one or more first messages comprise System Information Block (SIB).

16. The method of claim 10, wherein the one or more second messages comprise a Registration Accept message.

17. The method of claim 10, wherein at least one frequency of the plurality of frequencies comprises a serving frequency, wherein a user equipment (UE) performing the method is currently camping on the serving frequency.

18. An apparatus comprising:

interface circuitry; and processing circuitry coupled with the interface circuitry, the processing circuitry to:

receive, from a radio access network via the interface circuitry, one or more first messages that include configuration information of at least two network slices and of a plurality of frequencies, wherein the configuration information indicates for each of the plurality of frequencies which one or more slices of the at least one network slice are supported;

receive, from a core network via the interface circuitry, one or more second messages to indicate a weight factor for at least one network slice of the at least two network slices; and select a cell from a plurality of cells on which to camp based on the configuration information and the weight factor.

19. The apparatus of claim 18, wherein the one or more second messages further indicate corresponding slice priorities for the at least one network slice.

20. The apparatus of claim 18, wherein the one or more second messages indicate a group of prioritized slices of the at least one network slice.

\* \* \* \* \*